United States Patent [19]

Matsuda et al.

[11] Patent Number: 4,800,409
[45] Date of Patent: Jan. 24, 1989

[54] CONTROL DEVICE FOR USE IN A CAMERA HAVING AN OBJECTIVE LENS

[75] Inventors: Motonobu Matsuda, Kawachinagano; Yoshihiro Tanaka, Osaka; Motohiro Nakanishi, Kobe; Nobuyuki Taniguchi, Nishinomiya; Hiroshi Ootsuka, Sakai, all of Japan

[73] Assignee: Minolta Camera Kabushiki Kaisha, Osaka, Japan

[21] Appl. No.: 43,616

[22] Filed: Apr. 28, 1987

[30] Foreign Application Priority Data

| Apr. 28, 1986 | [JP] | Japan | 61-99233 |
|---|---|---|---|
| Jul. 16, 1986 | [JP] | Japan | 61-167466 |
| Jul. 16, 1986 | [JP] | Japan | 61-167467 |
| Jul. 16, 1986 | [JP] | Japan | 61-167468 |
| Jul. 16, 1986 | [JP] | Japan | 61-167470 |

[51] Int. Cl.⁴ .......... G03B 3/00; G03B 7/08; G03B 15/02; G02B 7/11
[52] U.S. Cl. .......... 354/402; 354/403; 354/413; 354/423; 354/432; 354/446
[58] Field of Search .......... 354/400–409, 354/429–434, 413, 419, 446, 423, 422, 415

[56] References Cited

U.S. PATENT DOCUMENTS

| 3,855,601 | 12/1974 | Uchiyama et al. | 354/433 |
|---|---|---|---|
| 4,047,187 | 9/1977 | Mashimo et al. | 354/432 X |
| 4,423,936 | 1/1984 | Johnson | 354/403 |
| 4,518,253 | 5/1985 | Takahashi | 354/403 X |
| 4,575,211 | 3/1986 | Matsumura et al. | 354/403 |
| 4,614,418 | 9/1986 | Ishizaki et al. | 354/407 |
| 4,637,705 | 1/1987 | Kawabata | 354/403 |
| 4,664,495 | 5/1987 | Alyfuku et al. | 354/432 X |
| 4,690,536 | 9/1987 | Nakai et al. | 354/432 X |

FOREIGN PATENT DOCUMENTS

| 48-94229 | 12/1973 | Japan . |
|---|---|---|
| 50-129220 | 10/1975 | Japan . |
| 51-134439 | 10/1976 | Japan . |
| 56-130608 | 10/1981 | Japan . |
| 59-31933 | 2/1984 | Japan . |
| 59-146032 | 8/1984 | Japan . |
| 59-193307 | 11/1984 | Japan . |
| 59-201009 | 11/1984 | Japan . |
| 60-36905 | 2/1985 | Japan . |
| 60-129732 | 7/1985 | Japan . |
| 60-189520 | 9/1985 | Japan . |
| 60-172008 | 9/1985 | Japan . |
| 60-232534 | 11/1985 | Japan . |
| 60-233610 | 11/1985 | Japan . |
| 61-70407 | 4/1986 | Japan . |
| 61-93440 | 5/1986 | Japan . |
| 61-194430 | 8/1986 | Japan . |

Primary Examiner—W. D. Perkey
Attorney, Agent, or Firm—Burns, Doane, Swecker & Mathis

[57] ABSTRACT

The present invention can be applied to a control device wherein the probability of giving the proper exposure to the primary object photographed is high even when the regions to be found in range within the photographing distance are plural, thereby to being capable of more positively judging the backlight condition, an automatic focus adjusting apparatus capable of more reflecting the photographing intention of the photographer, an exposure control apparatus capable of normally providing the proper exposure amount with respect to the photographed object independently of the distance to the object photographed even when the daylight synchronized flash photographing operation is performed, and a control device which does not need a switching circuit and the switching operation by it.

24 Claims, 17 Drawing Sheets

Fig. 1
Fig. 3
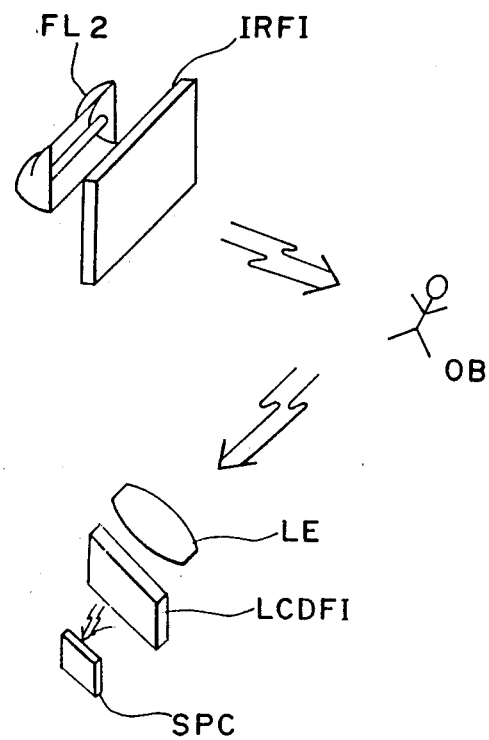
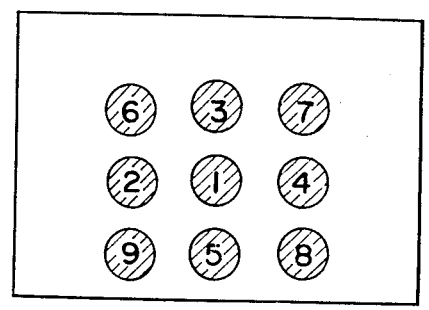
Fig. 2
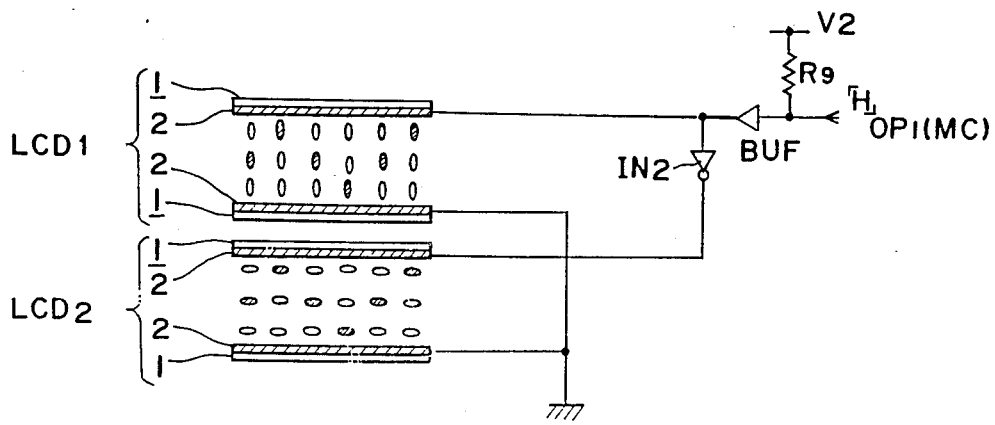

Fig. 8
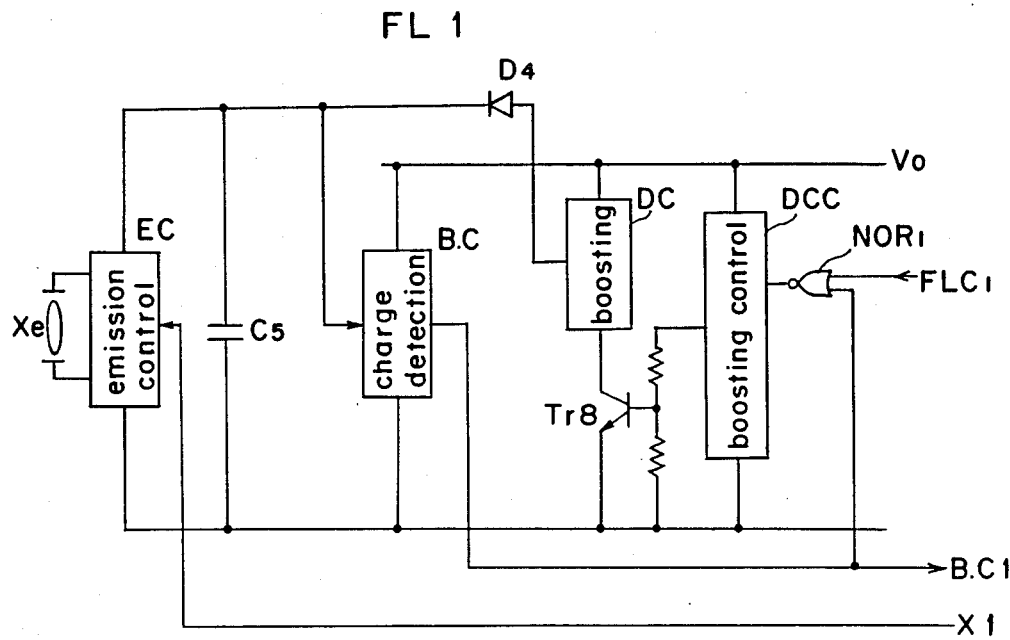
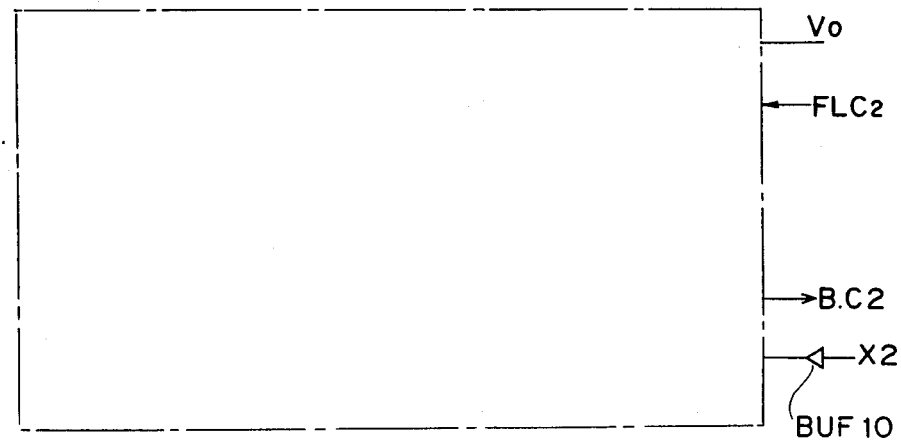

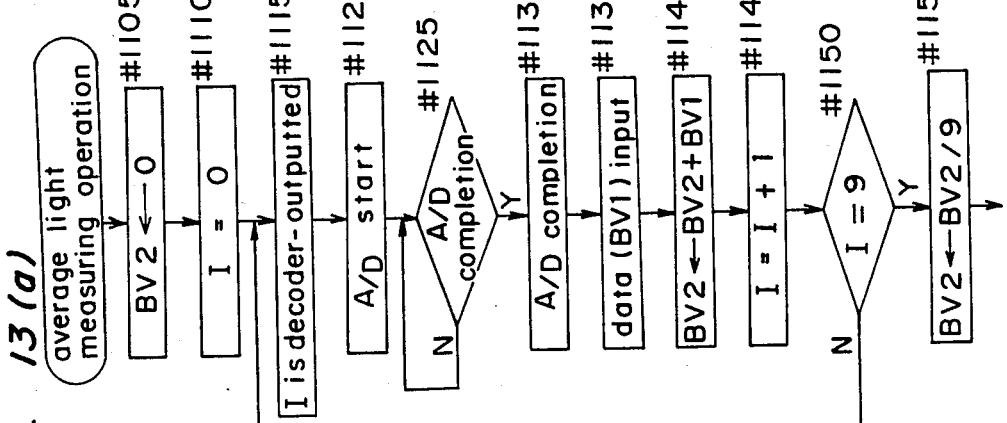

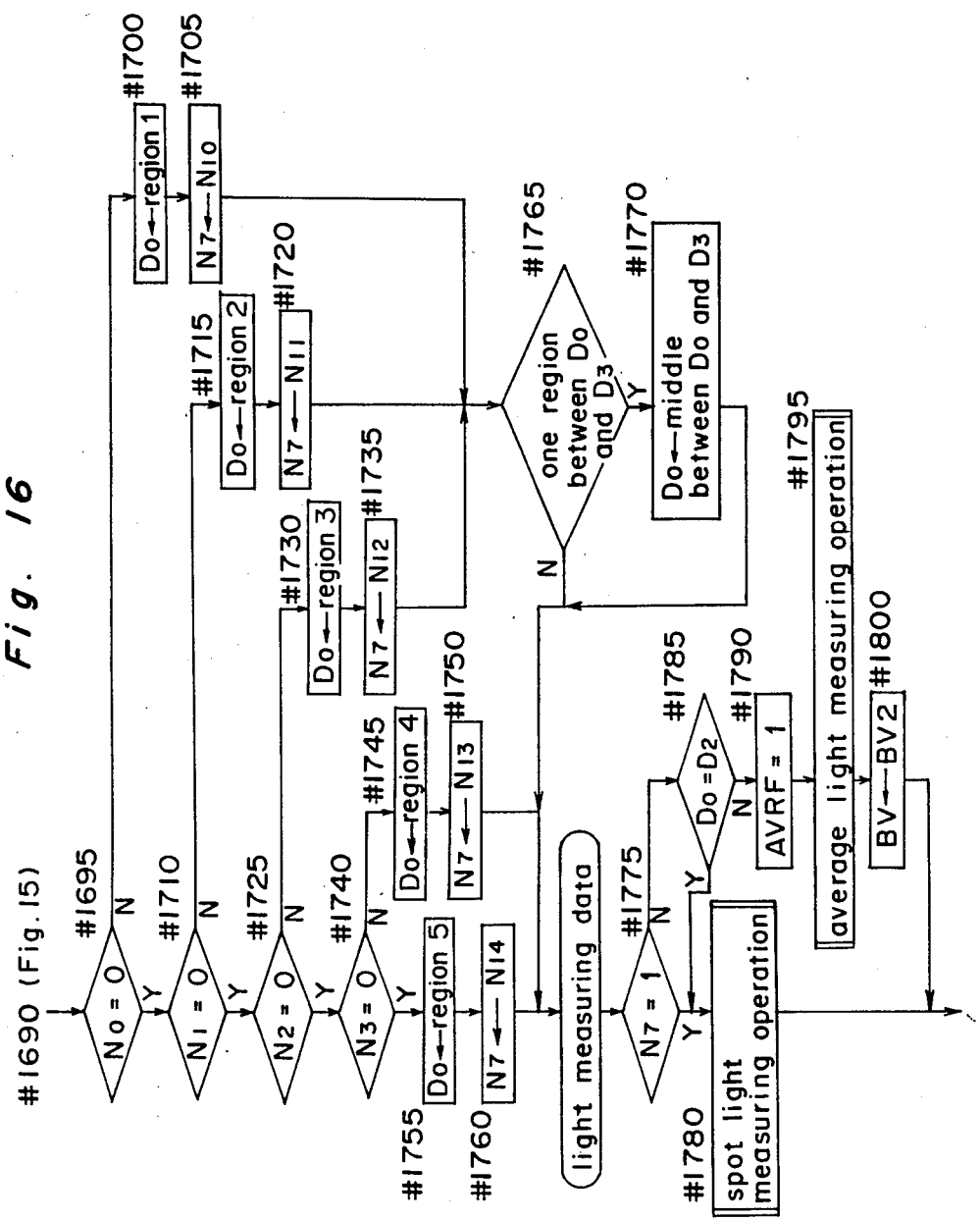

CONTROL DEVICE FOR USE IN A CAMERA HAVING AN OBJECTIVE LENS

BACKGROUND OF THE INVENTION

1. Field of the Invention

The present invention relates to a control device for use in a camera, and more particularly to a control device which controls both the focusing operation of an objective lens of the camera and exposure operation of the camera.

2. Description of the Prior Art

There has been proposed, in U.S. Pat. No. 4,423,936, a control device in which distance detection for the focusing operation and a light measuring for the exposure operation are performed with respect to a plurality of regions in an object area to be photographed, and a distance is selected among the detected distances for the focusing operation. If the selected distance is detected with respect to a single region, a light measurement value measured with respect to the single region is used for exposure operation to control exposure value. On the other hand, if the selected distance is detected with respect to plural regions, plural light measurement values measured with respect to the detected regions are averaged to be used for the exposure operation to control exposure value.

However, in the conventional device as described above, since a primary object to be focused is not always positioned at the detected plural regions, the possibility for obtaining proper exposure for the primary object is relatively low.

Furthermore, in the conventional device, backlight condition is detected in the case that, difference between a first light measurement value measured with respect to the region in which the selected distance is detected and a second light measurement value calculated by averaging all of other light measurement values, is over a predetermined value. Here, if the selected distance is detected with respect to plural regions, the first light measurement value is calculated by averaging plural light measurement values of the plural regions. However, the difference is not always indicating whether the backlight condition or not in the latter case. Fore example, if the selected distance is detected in two regions arranged symmetrically with an optical axis of the objective lens, it is impossible to judge at which region a primary object is positioned in the device. In such case, it would be improper to detect the backlight condition.

There has been proposed, in Japanese Laid-Open patent application No. 60-129732, another control device in which a common ligh receiving device is used for the light measuring and for the distance detection. In the device, one calculating circuit for distance detection and the other calculating circuit for light measuring are provided, and the output of the common light receiving device is sent to two calculating circuits in time-sharing manner or in time-dividing manner. The distance detection calculation and exposure calculation are performed in respective circuits. However, such device has disadvantages that the construction thereof becomes comples since two calculating circuits and switching circuit for selectively transmitting the output of the light receiving device to the two calculating circuits are necessary, and that the operation of the entire device becomes complex since switching operation of the switching means is necessary.

SUMMARY OF THE INVENTION

Accordingly, an object of the present invention is to provide a control device for use in a camera having an objective lens wherein the probability of giving the proper exposure to the primary object photographed is high even when the selected distance is detected with respect to plural regions.

Also, another object of the invention is to provide a control device for use in a camera having an objective lens which is capable of more positively judging the backlight condition.

An additional object is to provide a control device for use in a camera having an objective lens which does not need a switching circuit for finding a range even when regions to be found in the range within the photographing distance are plural.

In accomplishing these and other objects, according to the present invention, there is provided a control device for use in a camera having an objective lens, comprising means for producing a plurality of distance signals necessary for focusing the objective lens on a plurality of first regions of an object area to be photographed; means for determining a distance on the basis of the plurality of distance signals to produce a determined distance signal for focusing the objective lens; means for driving the objective lens in accordance with the determined distance signal; means for measuring a plurality of brightnesses of second regions of the object area to produce a plurarity of brightness signal each corresponding to the measured brightnesses respectively, each of the second regions being substantially similar to each of the first regions, respectively; means for counting the number of the distance signals used in the distance determining means for determining the distance; means for discriminating whether the number counted by the counting means is single or plural; means for determining a light measuring value by a first calculation when the discriminating number is single, while determining the light measuring value by a second calculation which is different from the first calculation and which is independent of the discriminated number when the discriminated number is plural; and means for calculating exposure value of the camera in accordance with the light measuring value, so that satisfactory exposure may be provided, judging from the experiences even when the selected distance is detected with respect to plural regions.

BRIEF DESCRIPTION OF THE DRAWINGS

These and other objects and features of the present invention will become apparent from the following description taken in conjunction with the preferred embodiments thereof with reference to the accompanying drawings, in which:

FIG. 1 is an illustrating view showing one arrangement of a light measuring optical system to be used in a first embodiment of the present invention;

FIG. 2 is an illustrating view showing the construction of a liquid-crystal filter of transmission wavelength switch type;

FIG. 3 is an illustrating view showing the light measuring range;

FIG. 8 is a block diagram showing the circuit construction of an electronic flashing apparatus in the first embodiment of the present invention;

FIGS. 10 through 14 are flow charts showing the operation of the microcomputer of FIG. 4; and FIGS. 15 and 16 are flow charts showing about the decision of the distance region for the photographing operation in the second embodiment of the present invention.

DETAILED DESCRIPTION OF THE INVENTION

Figure 4:
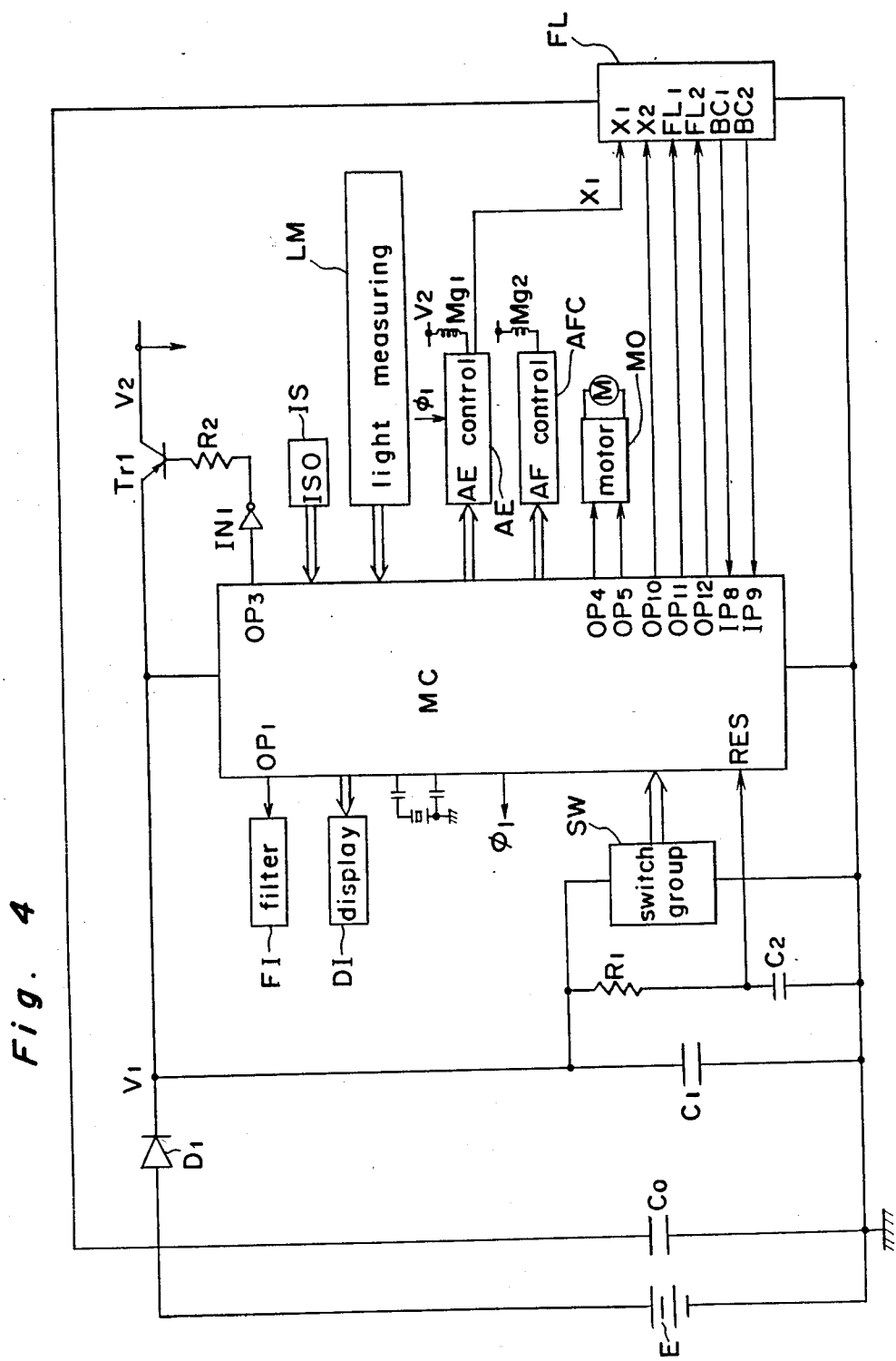
FIG. 4 is a block diagram showing a light measuring circuit employed in the first embodiment of the present invention.

Before the description of the present invention proceeds, it is to be noted that like parts are designated by like reference numerals throughout the accompanying drawings.

The embodiment wherein the present invention has been applied upon the lens shutter camera will be described with reference to the accompanying drawings. First, the distance detection and the light measurement to be used in the embodiment will be described in principle. The distance detecting apparatus is composed of a projecting means for projecting the light onto the entire region of the photographed field to be detected in distance, a light-receiving means for receiving the light to be reflected from the object, and a circuit for processing the signals from the light-receiving means to detect the distance.

The light-receiving means is composed of a plurality of light-receiving elements, by which the photographed field is divided into a plurality of regions to detect the respective distances. And one of the distances is selected as a distance where the photographing lens is focused, thereby the brightness of the selected region is detected as supposing that a primary object is positioned in the selected distance. In the present embodiment, the common light-receiving elements are used for both the distance detection and the brightness detection.

Referring now to FIG. 1, there is shown a concrete example of the optical system with the light-receiving element being provided for common use. An electronic flashing apparatus FL2 is the projecting means which projects the light on the entire region of the photographed field through the filter IRF1 provided on the front face, through which the infrared light of particular wavelength or wavelength range is transmitted. The light-quantity emitted by the electronic flashing apparatus FL2 is by far less than the light-quantity emitted by the electronic flashing apparatus for object illumination use to be employed in the photographing operation. A condenser lens LE collects the light reflected from the object OB to guide into the light receiving element SPC. A filter LCDF1 which is adapted to be capable of switching to a filter for transmitting the infrared light of particular wavelength or wavelength range through it, and a filter having the characteristics of visual sensitivity is provided between the condenser lens LE and the light-receiving element SPC.

This filter is constructed as shown in FIG. 2. Namely, the filter LCDF1 is composed of a guest-host type liquid crystal devices LCD1 and LCD2. When the signal of the "High" level (hereinafter referred to as "H") is outputted from a terminal OP1 of a microcomputer MC shown in FIG. 4, a predetermined voltage V2 is applied upon a first liquid crystal device LCD1 through a buffer BUF, and the first liquid crystal device LCD1 comes to let the infrared light of the particular wavelength or wavelength range pass through it. On the other hand, when the signal of the "Low" level (hereinafter referred to as "L") is outputted from the output terminal OP1 of the microcomputer MC, the predetermined voltage V2 is applied upon a second liquid crystal device LCD2 through a buffer BUF and an inverter IN2, so that the second liquid crystal device LCD2 comes to operate as a visible-sensitivity filter through which the light of the visible sensitivity range may pass. The buffer BUF and the inverter IN2 are adapted to be fed by the power voltage to be described later. Accordingly, when the release button (not shown) is not depressed, both the liquid crystal devices remain colorless in light transmission condition without application of the voltage.

The light-receiving element SPC shown in FIG. 1 is composed of a plurality of elements as described hereinabove and is adapted to measure each of a plurality of regions ① through ⑨ of the object field shown by rectangular frame in FIG. 3. A plurality of the light-receiving elements are arranged to measure the region which is deviated a little downwardly of the object field as a whole, and are composed of nine elements in total arranged symmetrically in the horizontal, vertical relation with the No. 1 light-receiving element as a center being provided to measure the region a little lower than the center of the object field. They are adapted to detect the distance and brightness of the regions ① through ⑨ shown in the oblique-line portions. The reason where they are arranged somewhat downwardly with respect to the field to be photographed is that the object or the person regarded as the primary object is often provided in the lower portion, but in the upper portion with the lens shutter camera having a comparatively wide-angle lens.

The camera system which performs the above-described described distance detection and brightness detection will be described hereinafter. In the block diagram of FIG. 4 showing the circuit construction of the entire camera, a power battery E consists of direct connection of two lithium cells each producing 3 V. A diode D1 is provided for preventing the voltage applied to the microcomputer MC from becoming lowered during the operation of the boosting circuit in the electronic flashing apparatus FL. A capacitor C0 is provided to prevent the noises and to hasten the charging operation to the main capacitor in the electronic flashing apparatus FL. A capacitor C1 has comparatively large in capacity for the back-up operation of the microcomputer MC. A resistor R1 and a capacitor C2 for resetting use are adapted to reset the microcomputer MC when the power batter E is mounted. A group of switches SW have a plurality of switches which are required for the operation of the apparatus of the present embodiemnt. The group of switches will be described in detail with reference to FIG. 5.

A display circuit DI displays the photographing information. A liquid-crystal filter FI, which is shown in FIG. 2, becomes an infrared filter or a visible-light filter. The microcomputer MC is provided to control the entire circuit. A film sensitivity setting circuit IS converts the film sensitivity, which is read from the code pattern provided on the film container or is manually set, into the film sensitivity value represented by A.P.E.X. system to output it into the microcomputer MC. A light measuring circuit LM is composed of a distance detection circuit for receiving the light, which are emitted from the electronic flashing apparatus FL for distance detection to be described later and are reflected from the object to detect the distance of the object, and a light measuring circuit for measuring the brightness BV of the object. An exposure control circuit AE for controlling the exposure in accordance with the exposure value EV to be outputted from the microcomputer MC outputs the flash starting signal X1 to the electronic flashing apparatus FL at a given timing. An AF controlling circuit AFC drives the objective lens to an in-focus position in accordance with the AF data to be outputted from the microcomputer MC. A motor controlling circuit MO controls the motor M for the winding operation of the film. The electronic flashing apparatus FL is composed of the electronic flashing apparatus FL2 for distance detection use and the electronic flashing apparatus FL1 for object illumination use during the exposure. A transistor Tr1 feeds the power voltage to the filter FI, the film sensitivity setting circuit IS, the light measuring circuit LM, the exposure controlling circuit AE, the AF control circuit AFC, and the motor control circuit MO in accordance with a signal from the microcomputer MC.

Figure 5:
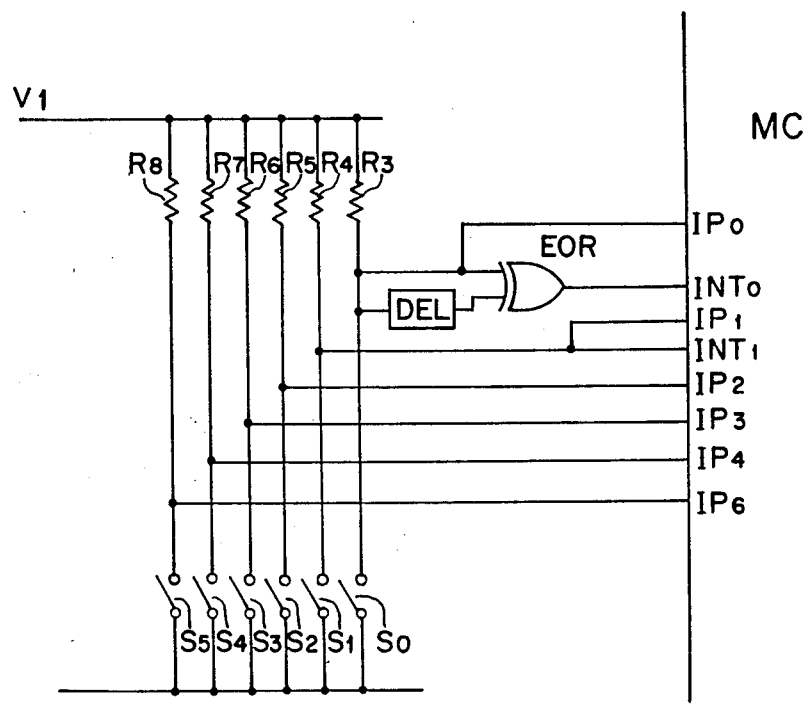
FIG. 5 is a circuit diagram showing the switch groups in FIG. 4.

FIG. 5 shows the concrete example of a group of switches SW in FIG. 4. A lens cover switch S0 turns on and off through the operative cooperation of the opening, closing operations of a lens cover (not shown). The pulse signal is outputted into the interruption terminal INT0 of the microcomputer MC through a circuit composed of a delay circuit DEL and an exclusive OR circuit EOR by turning on and off of the switch S0. When it is inputted into the microcomputer MC, the microcomputer executes a given interruption routine INT0. A photograph preparing switch S1 turns on when the release button (not shown) is depressed as far as the first stroke. If the switch S1 is turned on when the lens cover is open, the interruption routine INT1 is executed. A release switch S2 turns on when the release button is depressed as far as a second stroke provided deeper than the first stroke. An exposure completion switch S3 turns off at the charging completion of the shutter charging member (not shown) and turns on at the exposure completion.

A one frame winding switch S4 turns off at the exposure completion and turns on at the completion of one frame winding completion. A switch S5 turns on when the objective lens is driven to the given position corresponding to the control signal and turns off at the charge completion of the shutter charging member.

The details of the light measuring circuit LM of the distance detection and the brightness detection to be used in the present embodiment will be described hereinafter with reference to the block diagram of FIG. 6.

The light measuring circuits LM1 through LM9 perform the distance detection and the brightness detection of the regions ① through ⑨ shown in FIG. 3, respectively. Each of the circuits for the distance detection latches the signals from the light-receiving element, i.e., the distance signal in response to a signal of the timing circuit TM, so that the signals from the light-receiving elements are latched at the timing when the intensity of the light projected from the electronic flashing apparatus FL2 becomes maximum in the variation thereof, thereby to output the signal to the selector SEL. The selectro SEL selects the signals from the light measuring circuits LM1 through LM9 by the signal from a decoder DE2, which is adapted to decode the signal from the microcomputer MC to output the selected signals to the encoder ED. The encoder ED converts the inputted signals into given forms to output them into the microcomputer MC. The distance signals of the light measuring circuis LM1 through LM9 are outputted to the microcomputer, by the signal from the microcomputer MC, sequentially through the selector SEL and the encoder DE1.

On the other hand, signals of the detected brightnesses are outputted as analog signals to the analog switch ANSW. The analog switch ANSW is composed of nine FETs, which are connected with the light measuring circuits LM1 through LM9 respectively, so that the respective brightness signals may be inputted, all the outputs being integrated into one, and are connected with the A/D converting circuit A/D. The selection of the analog switch ANSW is performed by the signal of the decoder DE2, which is adapted to decode the signal from the microcomputer MC as in the distance signal, and is sequentially performed from the light measuring circuits LM1 through LM9. The brightness signal which has been outputted to the A/D converting circuit A/D through the analog switch ANSW is converted into digital forms and is outputted into the microcomputer MC.

The details of the light measuring circuit LM1 and the timing circuit TM1 are the above-described diagram will be described in FIG. 7. The portion surrounded by the dotted lines in the drawing shows the timing circuit, and the portion except for it shows the light measuring circuit.

First, the timing circuit TM1 will be described. When the release button is depressed, the signal of "H" is outputted from the terminal OP8 of the microcomputer MC before the electronic flashing apparatus FL2 starts to emit the light, and the transistor Tr2 turns on to discharge the capacitor C3. The transistor Tr2 is turned off immediately before the light emission to wait therefor. A phototransistor PHT1 which charges the capacitor C3 is disposed near the light emitting portion of the electronic flash apparatus FL2 and is adapted to directly receive the emitted light. When the electronic flashing apparatus FL2 emits the light in this condition, the current corresponding to the intensity of the light received by the phototransistor PHT1 is charged into the timing capacitor C3 through the phototransistor PHT1. When the voltage of the capacitor C3 exceeds a reference voltage Vr1, the comparator COMP1 is reversed to output the signal of the "H". The signal of the "H" is pulsed by the one-shot circuit OS1 and is outputted into the terminals T of the D flip-flops to be described later to latch the amplification signal from the light-receiving element SPC1. The reference voltage Vr1 is adapted to reverse the comparator COMP1 at the time point when the intensity of light emitted by the electronic flashing apparatus FL2 is slightly lower from the maximum intensity.

The light measuring circuit LM1 will be described hereinafter. The voltage is applied through the power supply line V2 by the depression of the first stroke of the release button to feed the power to each circuit. At once, the signal of the "H" is outputted from the terminal OP9 of the microcomputer MC to turn on the analog switches AS1, AS2 so that constant current circuits I1, I2 start to flow constant currents, respectively. After the lapse of a predetermined time (as the lowest 20 msec is assigned to that time in the present embodiment), the light measuring circuit LM1 remains stable.

The circuit operation before the stability of the circuit LM1 will be briefly described. As the voltage of the capacitor C4 is extremely low when the constant current circuits I1, I2 start to flow constant currents, the transistor Tr3 does not turn on. Constant current I1 flown by the constant current circuit I1 and the photocurrent IP which corresponds to the brightness of the particular wavelength light passing through the filter flow to the base of the transistor Tr4 to be amplified there. The amplified current flows through the transistor Tr6, and the equivalent current flows through the transistor Tr7 which constitutes a known current mirror circuit with the transistor 6. One part of the current becomes current of the constant current circuit I2 and the remaining current flows through the diodes D2, D3 to cause the voltage VD corresponding to two steps of the diode. The operation amplification OP1 has a reference voltage Vref inputted into the inversion input terminal, and has the voltage VD inputted into the non-inversion input terminal, and the negative feedback is applied upon the transistor Tr3 so that the voltage VD may become always constant.

As the current flowing through the transistor Tr7 corresponds to the current which has amplified most of all the photocurrent IP and the constant current I1, the voltage VD to be caused by this current becomes higher than the reference voltage Vref. Accordingly, the operation amplifier OP1 charges the capacitor C4 to boost the base voltage of the transistor Tr3. This capacitor C4 is charged through the transistor Tr4. When the voltage of the capacitor C4 is boosted to turn on the transistor Tr3, the constant current I1 and the photocurrent IP flow through the collector of the transistor Tr3 to reduce the current flowing through the base of the transistor Tr4. Thus, the current flowing through the transistor Tr6 and the transistor Tr7 is reduced to lower the voltage VD, so that the above-described operation is performed until the voltage VD becomes equal to the reference voltage Vref. During this operation, the voltage VD may become lower than the reference voltage Vref. At this time, the operation amplifier OP1 operates for discharging the charge of the capacitor C4 to reduce the voltage thereof, which reduces the current through the transistor Tr3 within the constant current I1 and the photocurrent IP so as to increase the base current of the transistor Tr4. Accordingly, the current which flows through the transistors Tr6 and Tr7 increases to boost the voltage VD.

This circuit is stabilized by the above-described operation to flow the current almost equal to the total of the constant current I1 and the photocurrent IP through the transistor Tr3, so that the voltage of the capacitor C4 for becomes equal to the base voltage corresponding to the current.

When the electronic flashing apparatus FL2 emits the light, the light reflected from the object is received by the light-receiving element SPC1 to cause the photocurrent IP' (which is referred to as IP' hereinafter to distinguish it from the above-described ambient photocurrent IP) corresponding to the light including a reflected light component reflected by the object and the ambient light component. The current IP of the ambient light component within the photocurrent flows through the collector of the transistor Tr3, and the current IP'-IP corresponding to the reflected light component flow as the base current of the transistor Tr4. At this time, the capacitor C4 has the capacity, in which the transistor Tr4 does not respond by the current while the reflected light is received by the light receiving element. And the current IP-IP' is amplified by the transistor Tr4 to flow the diodes D2, D3 through the transistors Tr6, Tr7. Thus, the voltage VD is increased to compare the voltage VD with the reference voltage determined by the constant current circuit I3 and the resistors R11 through R14, so that the distance signal is represented as the outputs of the comparators COMP2 through COMP5. The output signals of the comparators COMP2 through COMP5 are latched into the D flip-flops DFF1 through DFF4 by the signal from the timing circuit TM to output the latch signal to the selector SEL.

After the distance detection has been performed in the above-described way, the filter arranged in front of the light-receiving element SPC1 is changed from a characteristic for permitting that the infrared light having the particular wavelength pass therethrough to the other characteristic for permitting that the visual light pass therethrough. Furthermore, the constant current circuit I1 is switched off to remove the voltage of the constant current I1 with respect to the charging voltage of the capacitor C4. The constant current circuit I2 is also turned off to cut off the route of the feedback of the transistor Tr3 through this constant current I2 so that the voltage of the capacitor C4 may become only the voltage which depends upon only the intensity of the ambient light component received by the light-receiving element SPC1. The voltage is outputted into the analog-switch ANSW through the buffer BUF1.

Figure 6:
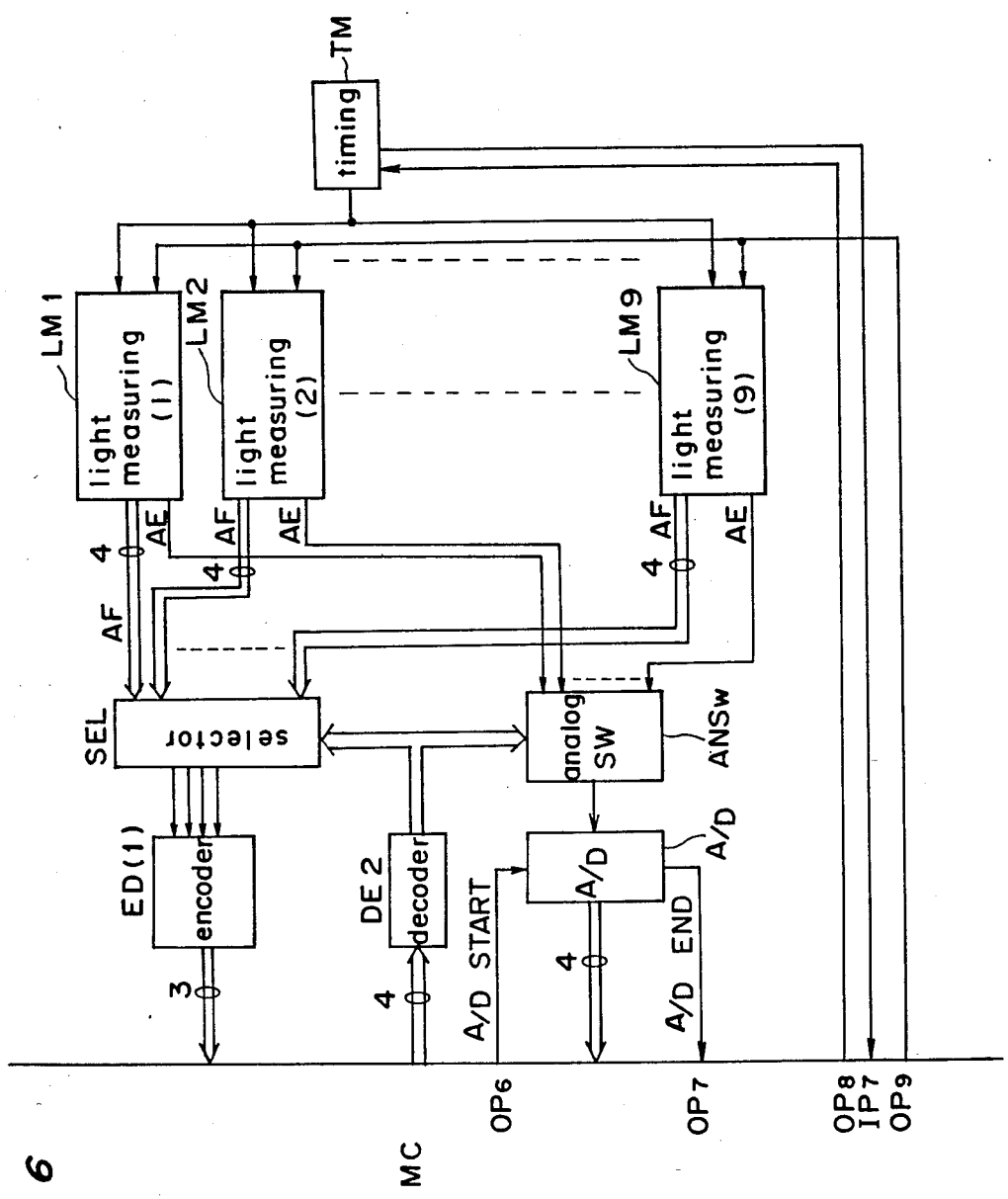
FIG. 6 is a further detailed block diagram of the light measuring circuit in FIG. 4.
Figure 7:
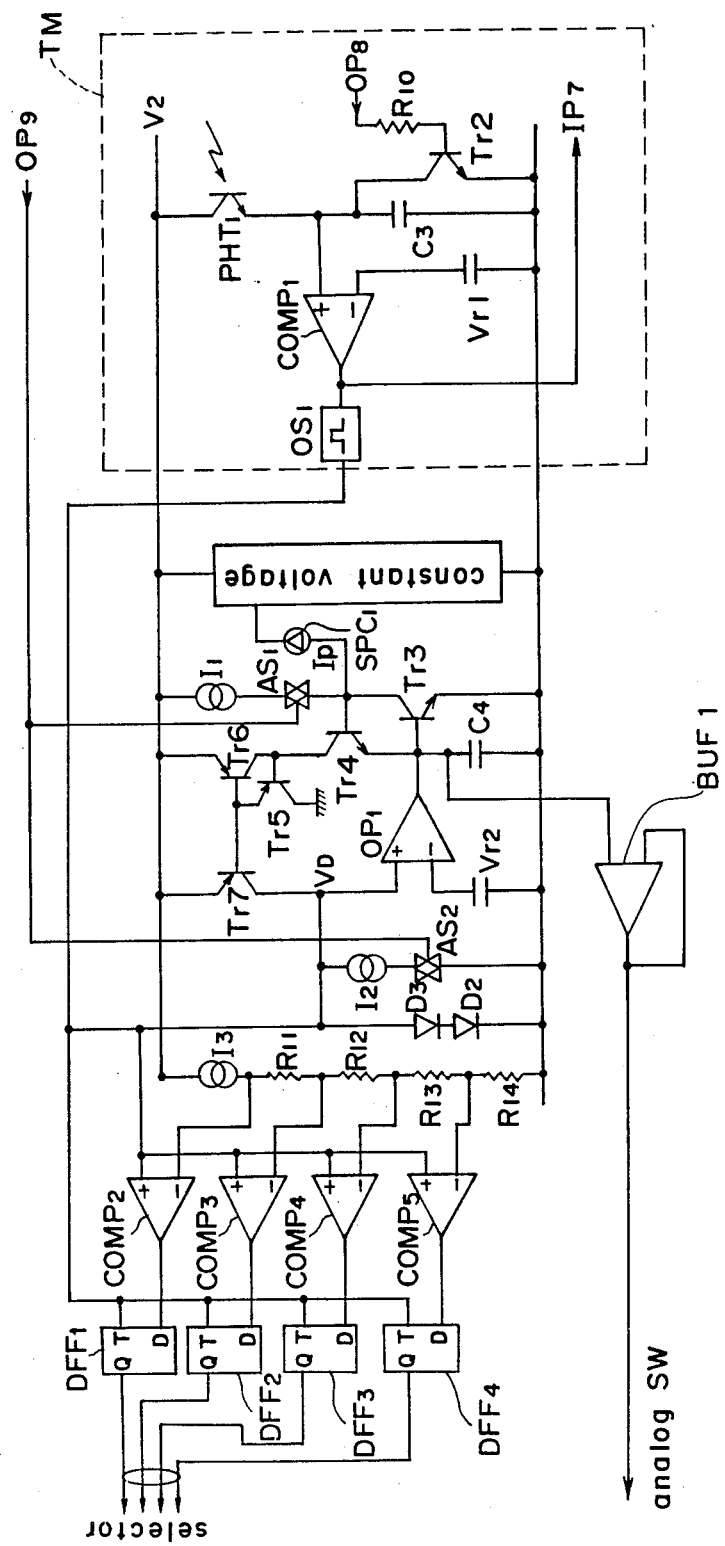
FIG. 7 is a circuit diagram showing the construction of the light measuring circuit and the timing circuit thereof.

The other light measuring circuits LM2 through LM9 shown in FIG. 6 are also completely the same in construction as in FIG. 7.

The electronic flashing apparatus FL1 for photograph use and the electronic flashing apparatus FL2 for distance detection use to be used in the embodiment will be described hereinafter with reference to FIG. 8. Except for the point that the electronic flashing apparatus FL2 for distance detection use is much smaller (approximately 1/25 in the maximum light emitting amount) than the electronic flashing apparatus FL1 for photographing use, the former is completely the same in the circuit construction as the latter FL1, thus removing the illustration of the concrete construction of the former with the circuit being shown simply in block.

In the circuit of the electronic flashing apparatus FL1 for photographing use, a boost controlling circuit DCC receives the boost controlling signal FLC1 from the microcomputer MC and produces the changing completion signal B.C1 to be described later to control the transistor Tr8 for boosting circuit DC. The rectification diode is represented by D4. A charge detecting circuit B.C detects the charging condition of a main capacitor C5. An emission control circuit EC energizes a xenon tube Xe in accordance with the emission signal X1 from the exposure control circuit AE to illuminate the object area. The emission signal X2 of the electronic flashing apparatus FL2 for distance detection use is fed through the buffer BUF10 from the microcomputer MC.

The operation of the electronic flashing apparatus FL1 for photographing use will be described. When the charging operation to the main capacitor C5 has not been completed, the charge completion signal B.C1 is in the "L" level. When the boosting control signal FLC1 of the "L" showing the boosting start is sent from the microcomputer MC, the NOR circuit NOR1 outputs the signal of "H", and the boost controlling circuit DCC receives it to control the transistor Tr8 to turn it on and starts the boosting operation. When the charging completion signal B.C1 becomes "H" level by the completion of the charging operation to the main capacitor C5 or the boosting control signal FLC1 from the microcomputer MC becomes "H" level, the NOR circuit NOR1 outputs "L" level, so that the boost controlling circuit DCC turns off the transistor Tr8 to stop the boosting operation of the boosting circuit DC. It is to be noted that a neon tube showing this condition lights on independently of the control circuit and the microcomputer MC when the charging operation of the main capacitor C5 is completed.

The entire operation of the camera in the embodiment will be described hereinafter. Before it, the number of the distance zones detected by the distance detection, the in-focus range in each region, and how to determine it will be described.

The distances to the objects located at each of the regions are detected in accordance with the absolute amounts of the light reflected by the objects as described hereinabove. However, as each of the objects has a reflectance different from that of the other objects, the distance detected by the detection apparatus is not always equal to the distance to the object. In the present embodiment, the in-focus range of each region is provided wider or the range is provided across two regions so that the focusing operation may be performed without fail on the object. However, if the distance range from the nearest focusing distance such as 0.6 m to the infinity distance is divided into five ranges, it is impossible to achieve the in-focus condition of the objective lens with respect to any object located within the distance range in the condition in which the aperture of the objective lens is fully opened, due to the focusing performance of the objective lens. Thus, in the embodiment the maximum aperture value is decreased in accordance with the decrease of the distance. Therefore, an in-focus range of particular distance zone can be extended to achieve the in-focus condition with respect to any object within the distance range, by dividing the latter into five ranges.

Here, since the embodiment uses a shutter serving as an aperture diaphragm, the reduction of the aperture value causes the shutter speed to shorten. Therefore, the brightness range in which the natural light photographing may be performed becomes narrower, the underexposure is likely to be caused. In this case, the flash photographing operation is performed to compensate for it. The shutter, also serving as an aperture diaphragm, which is used in the present embodiment, is a type showing the triangular waveform in time-variation characteristics of the opening degree. The shutter gradually opens to reach the given aperture value, and is adapted to move to the closed operation.

Five ranges determined in accordance with the above-described idea and their in-focus ranges, the maximum aperture value of the use limit at this time, and the aperture value at the flash photographing operation will be described in FIG. 9.

In the drawing, the axis of ordinates shows the regions 1, 2, 3, 4, 5 arranged in order from the near distance side. The axis of abscissa shows the distance as far as 0.6 m through ∞. The focusing range of each region will be described. As shown in FIG. 9, in the region 1, the open aperture value is limited to F/8, and the object distance of the objective lens is set to 0.75 m. Thus, the object positioned within a distance range from 0.56 m to 1.1 m can be in-focus condition on the predetermined focal plane by the objective lens. In the region 2, the open aperture value is limited to F/5.6, and the object distance is set to 1.0 m, thereby the objective lens is set to be in in-focus condition with respect to an object positioned within a distance range from 0.77 m to 1.5 m. In the region 3, the open aperture value is limited to F/4, and the object distance is set to 1.5 m, thereby the objective lens is set to be in in-focus condition with respect to an object positioned within a range from 1.1 m to 2.2 m. In the region 4, the open aperture value is limited to F/3.5, and the object distance is set to 2.1 m, thereby the objective lens is set to be in in-focus condition with respect to an object positioned within a distance range from 1.5 m to 3.6 m. In the region 5, the open aperture value is limited to F/3.5 and the object distance is set to 5 m, thereby the objective lens is set to be in in-focus condition with respect to an object positioned within a distance range from 2.7 m to ∞.

Figure 9:
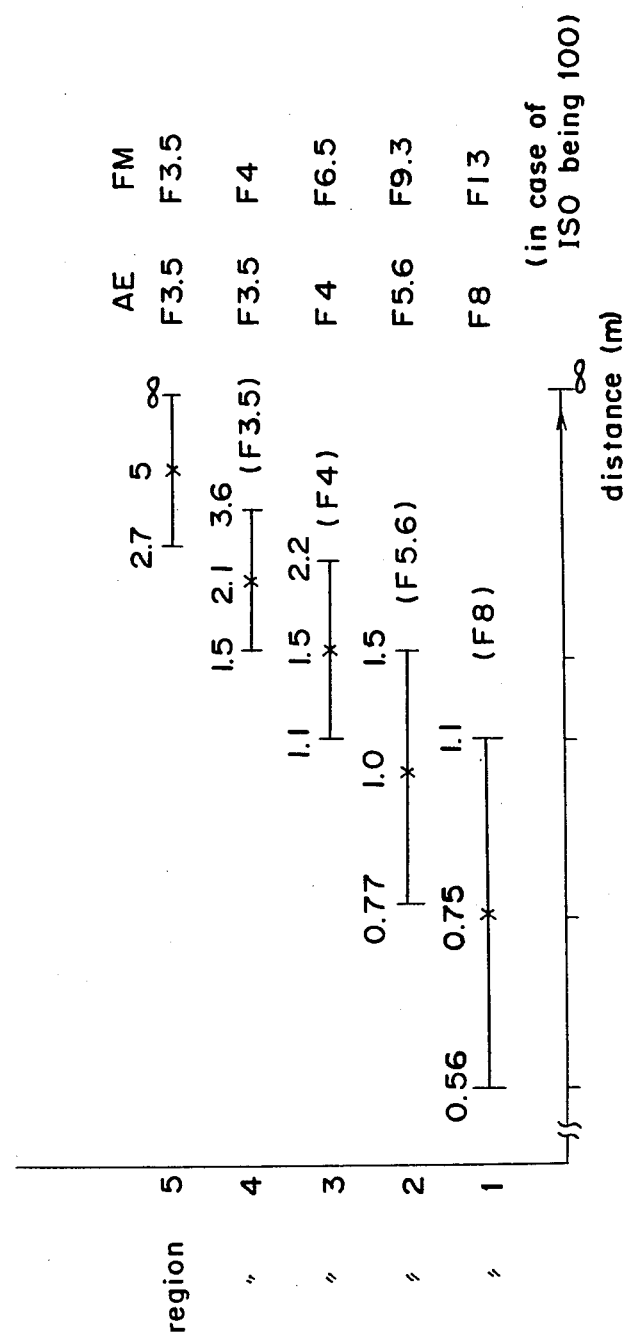
FIG. 9 is a graph showing the relationship among the distance region of the photographed object, the focusing range and the aperture value (so-called lens opening)

The aperture value used in flash photographing operation is determined as shown in "FM" in FIG. 9. The guide number of the flashing apparatus is determined to be 10 with respect to a film sensitivity of ISO=100. In the region 1, the aperture value in flash photographing operation is set to F/13, so that under- or over-exposure is provided by 1 step with respect to the object located at the nearest or farthest distance within the distance range of region 1. Only the same exposure amount is designed to become over or under with respect to both the ends. In the region 5, the flash photographing operation is adapted to be performed as far as possible with F/3.5 in the open aperture value.

FIGS. 10 through 14 show the flow charts of the microcomputer MC. The controlling operation of the camera will be described with reference to the flow charts.

Figure 10:
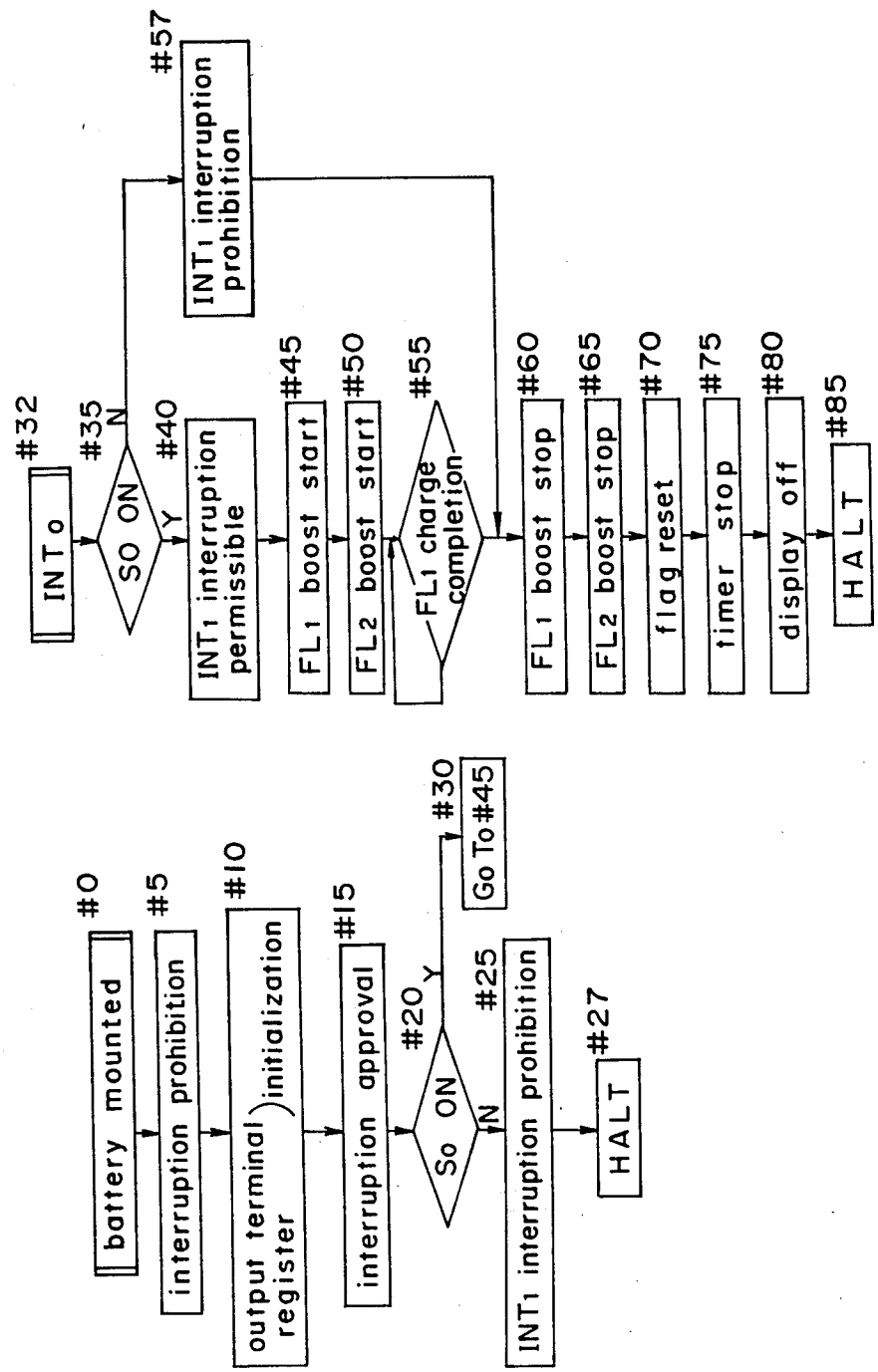

The operation with the battery E being mounted on the camera will be described with reference to FIG. 10. When the battery E is mounted thereon, the signal which changes from "L" to "H" is inputted into the reset terminal RES, the microcomputer MC executes the flow to prohibit the interruption (#5) and to initially set (#10) the output terminals, the registers. Then, the signal of the terminal IP6 shown in FIG. 5 is inputted and the microcomputer MC allows the interruption to decide whether or not the lens cover is open. When it is closed, the interruption to the interruption terminal INT1 to be described later is prohibited to come to a stop (#25 through #27). On the other hand, the program proceeds to step #45 to be described later when the lens cover is open.

The interruption INT0 which is executed through the opening and closing operation of the lens cover will be described hereinafter. If the lens cover is opened or closed in the condition where the interruption to the flow is allowed, the pulse is inputted into the terminal INT0, so that the microcomputer MC executes the interruption INT0 operation from the step #32. At first, the decision is made as to whether the lens cover has been opened or closed (#35). When the lens cover has been closed, the interruption of the flow of the interruption to the flow of the interruptions INT1 to be described later is prohibited (#57) to proceed to the step #60 (#35, 37). When the lens cover has been opened, the interruption to the terminal INT1 is allowed (#40), the signals of "H" to the output terminals FLC1, FLC2 are outputted (#40 through 50) to start the boosting operation of the electronic flashing apparatus FL1, FL2 for photographing use and distance detecting use so as to decide whether the charging operation of the main capacitor of the electronic flashing apparatus FL1 for photographing use has been completed through the output signal BC1 (#55). Even when the lens cover is open with the battery being mounted on, the program proceeds to the step #45. When the charging completion of the main capacitor is decided at the step #55, the signals of "L" are outputted to the terminals FLC1, FLC2 (#60, 65) to stop the boosting operation of both the electronic flashing apparatuses FL1, FL2 for photographing use and distance detection use. And all the flags are reset at the step #70. The counting timer started in the interruption flow ot the INT1 shown in FIG. 11 is stopped to turn off the display, and the microcomputer MC becomes halt condition (#70 through 85).

Figure 11A:
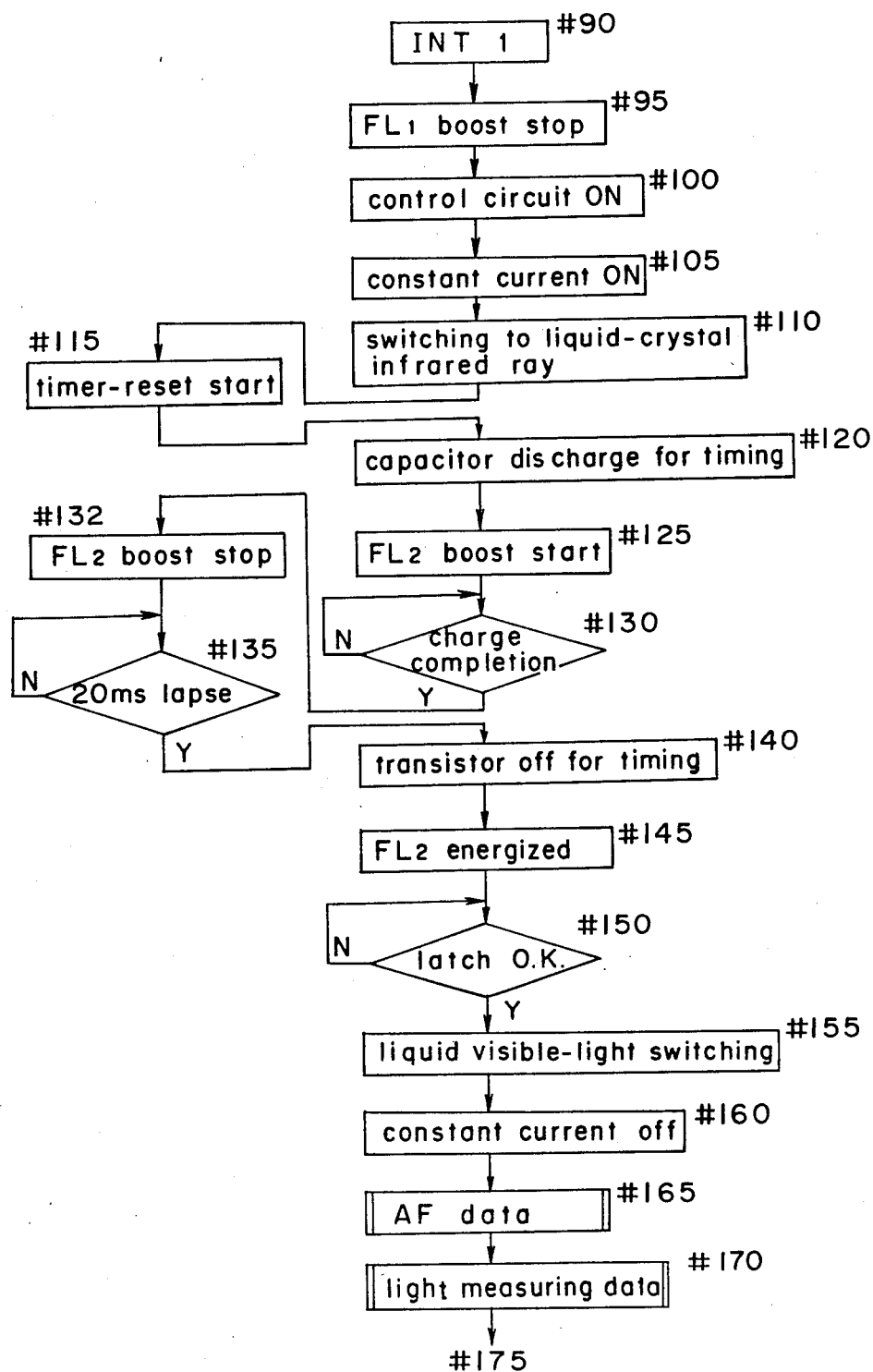
Figures 11, 11B, 11C:
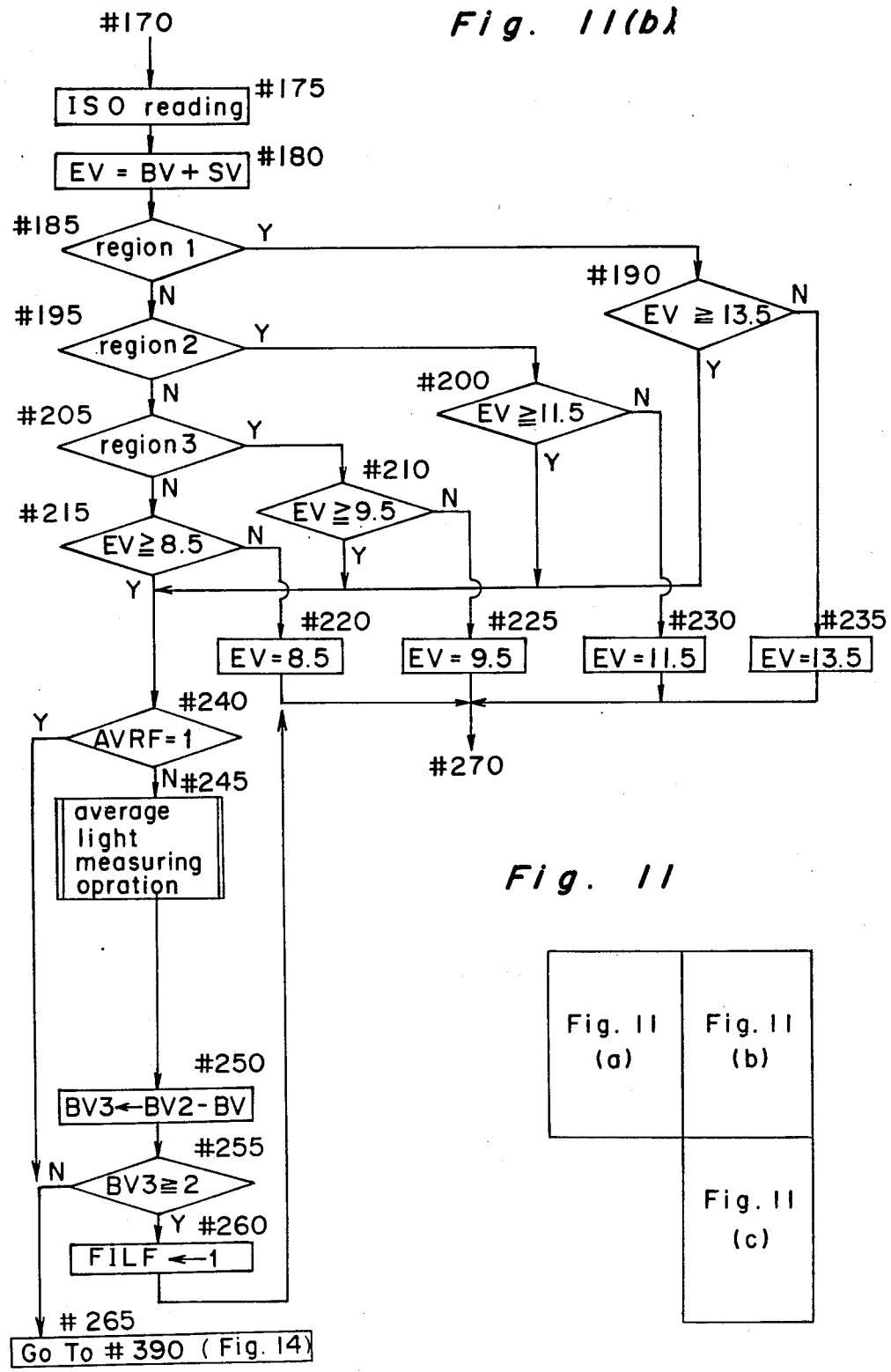
Figure 11C:
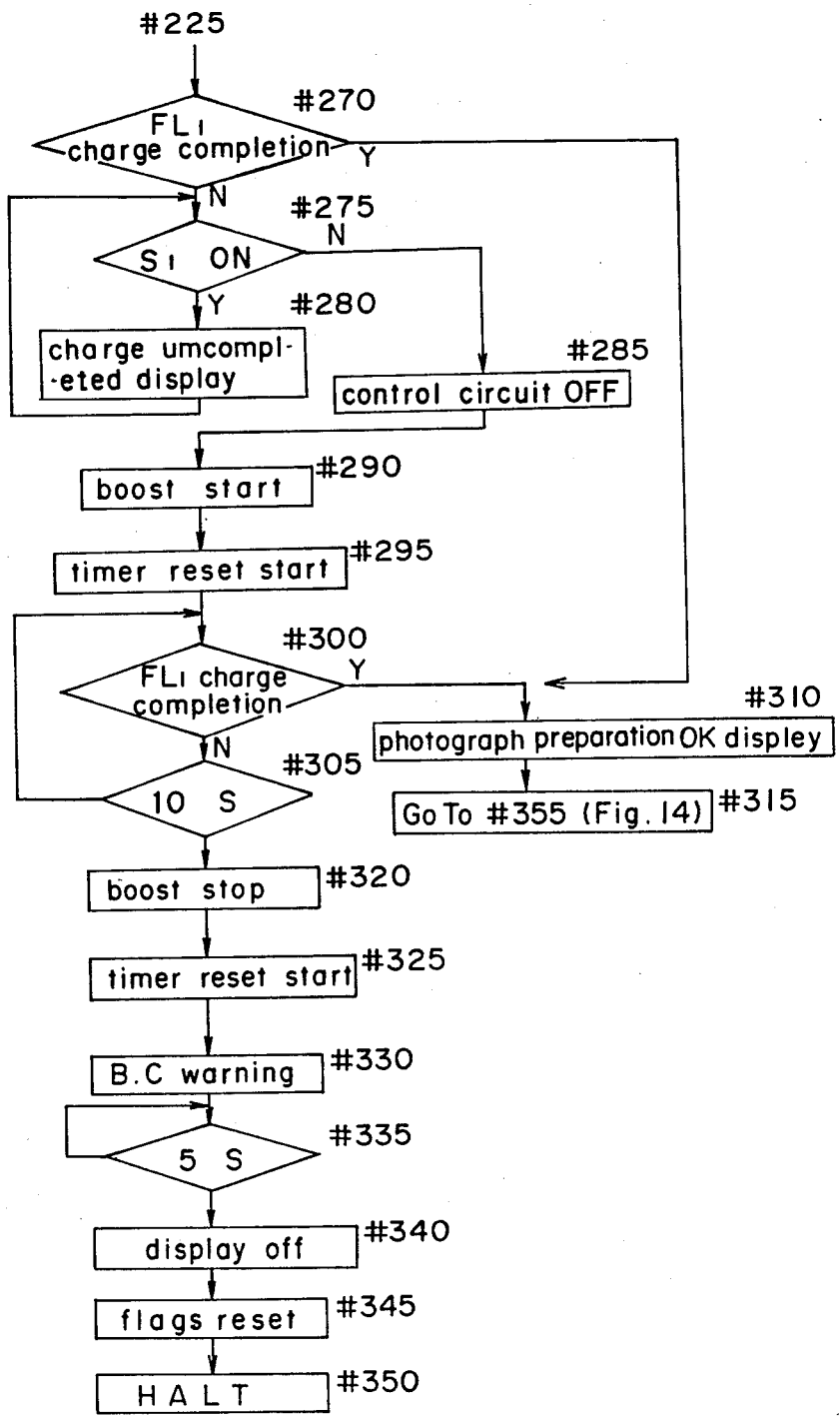

Then, in FIG. 11, when the release button is depressed to the first stroke with the lens cover being opened, the signal which changes from "H" to "L" is inputted to the terminal INT1 and the microcomputer MC executes the flow of the interruption INT1 from the step #90.

In order to perform the distance detection and the brightness detection, the boosting operation of the electronic flashing apparatus FL1 for photographing use is stopped operation and the decrease in the battery voltage (#95). Then, the transistor Tr1 is turned on to supply the power supply to each control circuits (#100). The analog switches AS1, AS2 are turned on to flow the constant current for distance detection use (#105), and the output of the terminal OP1 is turned into "H" so that the filter is switched for infrared ray use to detect the distance (#110). The timer for counting the time required for the circuit stability is reset and started (#115), and the transistor Tr2 for timing use is turned on (#120) to discharge the timing capacitor C3 for the determination of the timing to latch the output of the distance detecting circuit. Then, the controlling operation is performed to start the boosting operation of the electronic flashing apparatus FL2 for distance detection use to wait for the completion of the charging operation of the capacitor C5 (#125, 130). After the charging operation of the capacitor C5 completes, the boosting operation is stopped (#132). And the decision is made whether or not 20 msec have passed from the timer start of the step #115. If they have not passed, the lapse is waited for. If they have passed, the transistor Tr2 for timing use is turned off (#135, 140). The signal of "H" is outputted into the terminal X2 to detect the distance and thereby the flashing apparatus FL2 for distance detection use is energized (#145). The signal from the timing circuit is inputted to detect whether or not the data of the result of the distance detection has been latched to wait for the data to be latched (#150). When the detection is performed that the data has been latched, the terminal OP1 is turned into "L" to detect the brightness to put the filter into the visible sensitivity use (#155). The analog switches AS1, AS2 are turned off (#160), and the subroutine for taking in the data for the latched distance detection use comes in preparation for the following brightness detection.

The subroutine will be described with reference to FIG. 12. The microcomputer MC sets variables N, N1, N2 into 0, and D0 into 5 (#1000 through 1015). This variable N is outputted into the decoder DE2 shown in FIG. 6 (#1020). The distance data detected by the light measuring circuit selected by the selector SEL which receives the output of the decoder DE2 are converted into a given coded data D1 by the encoder ED, and the coded data are inputted into the microcomputer MC at the step #1025. This data D1 corresponds to the detected distance region, that is either of the regions 1 through 5. For example, the coded data D1 shows 1 if the detected distance region is the region 1, while the data D1 shows 5 if the detected distance region is the region 5.

The nearest distance region among the distance regions detected by each of the light receiving circuits LM1 through LM5 is selected in accordance with the data D1. First, a decision is made as to whether or not the data D0, wherein the data corresponding to the distance region 5 is set, are equal to the input data D1. If they are equal to each other, 1 is added to the variable N1 (#1030, 1035). This variable N1 is provided for deciding if the number of the light measuring circuits which detect if the nearest distance region is single or plural. The data D0 are set in D1 to add 1 to the variable N (#1045, 1065). On the other hand, in the step #1030, the program proceeds to the step #1050 when the set data D0 are not equal to the input data D1 to decide whether or not the input data D1 is in the distance region nearer than the set data D0. The program proceeds to the step #1045 when it is not in the nearer distance region. When it is in the nearer distance region, the variable N1 is set in 1, and the variable N2 is set to the variable N to proceed to #1040 (#1055, 1060). This variable N2 shows either of the light receiving regions ① through ⑨ shown in FIG. 3. In the step #1065, the decision is made whether or not the variable N is 9, i.e., whether or not the distance data of the light-receiving regions ① through ⑨ have been inputted after the addition of 1 to the variable N at the step #1045. If the inputting operation of the distance data has not been finished, the step returns to the step #1020 to repeat the loop. If the inputting operation of the distance data has been finished, the program returns to the original flow of FIG. 11 at the step #1067 to proceed to the next light measuring data subroutine of the step #1070.

Figure 12B:
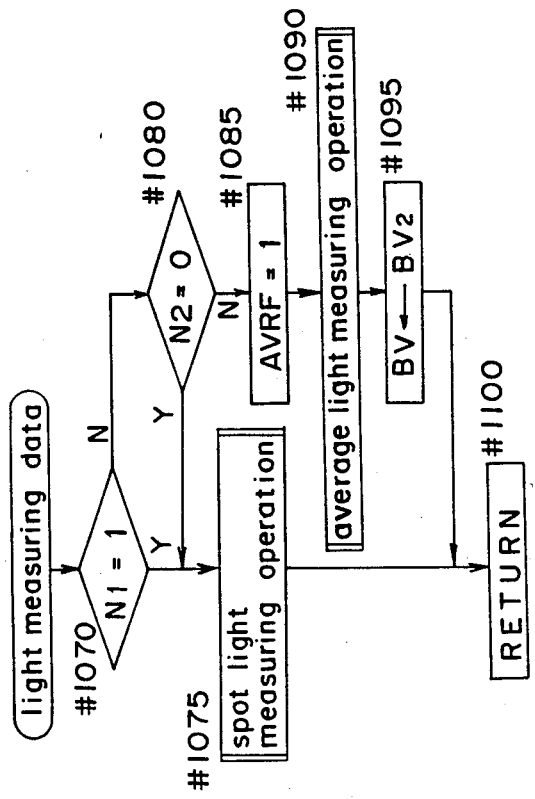
Figure 12A:
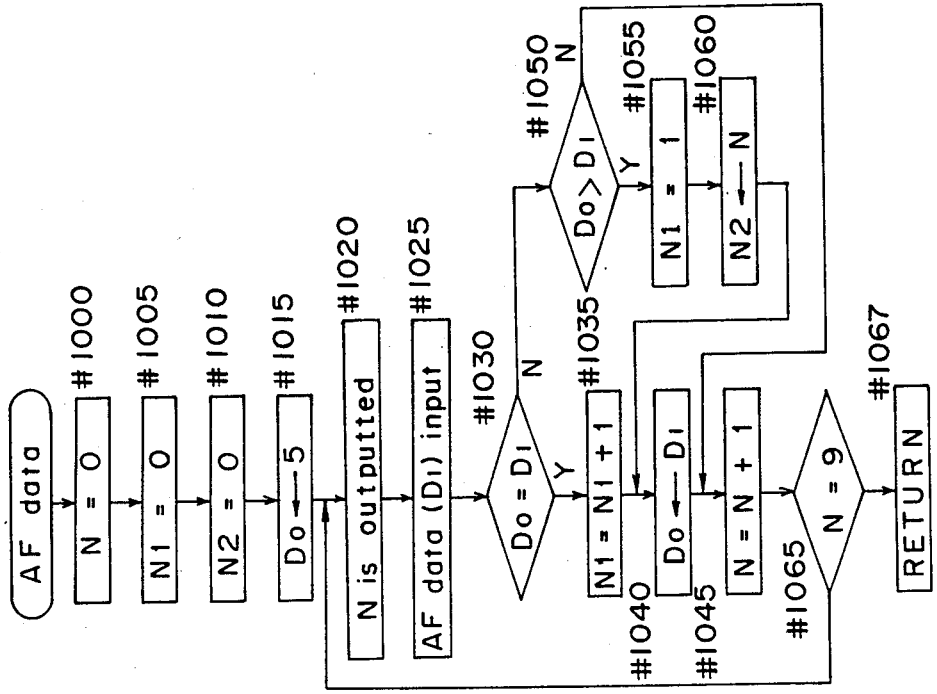
Figures 14, 14A, 14B:
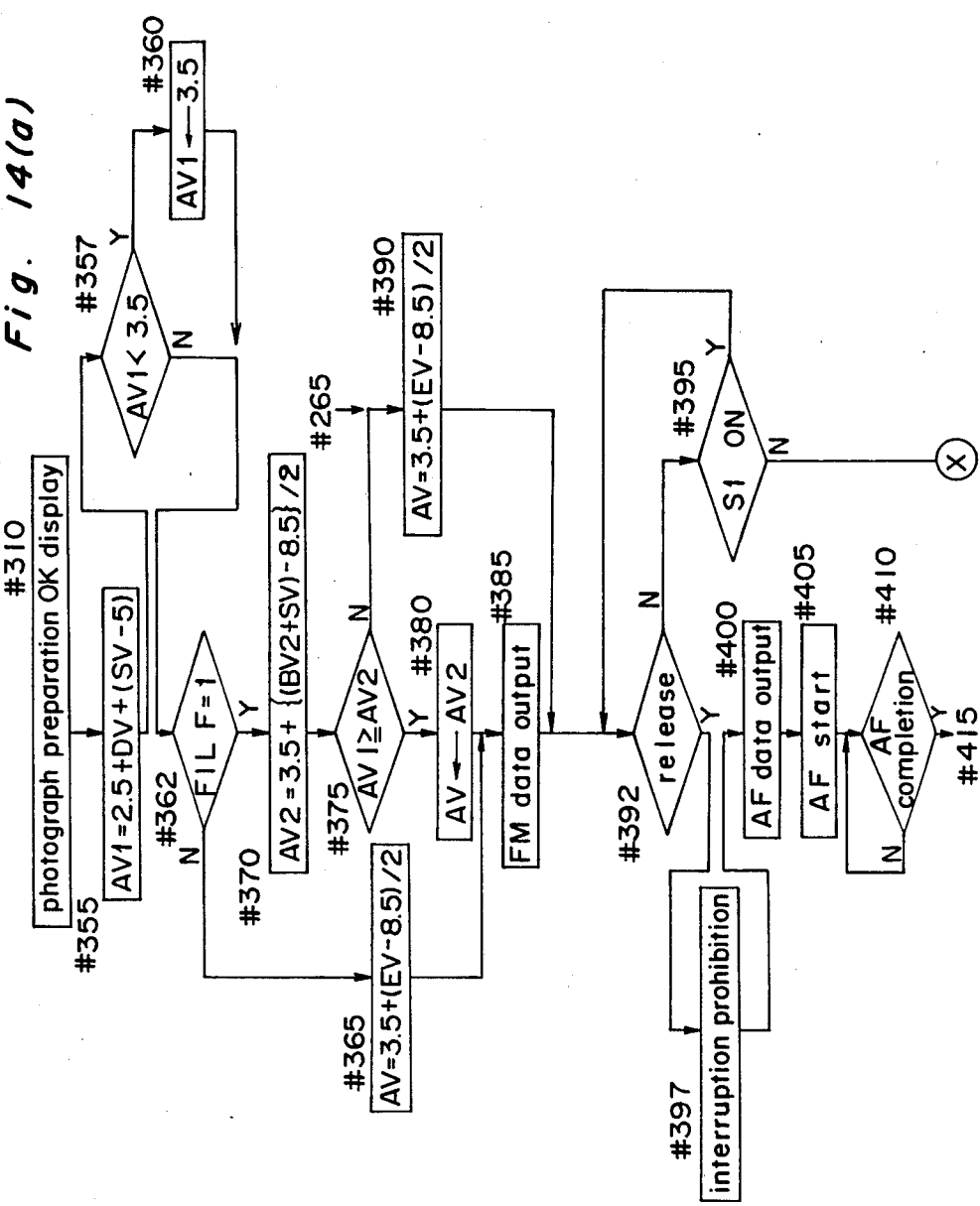
Figure 14B:
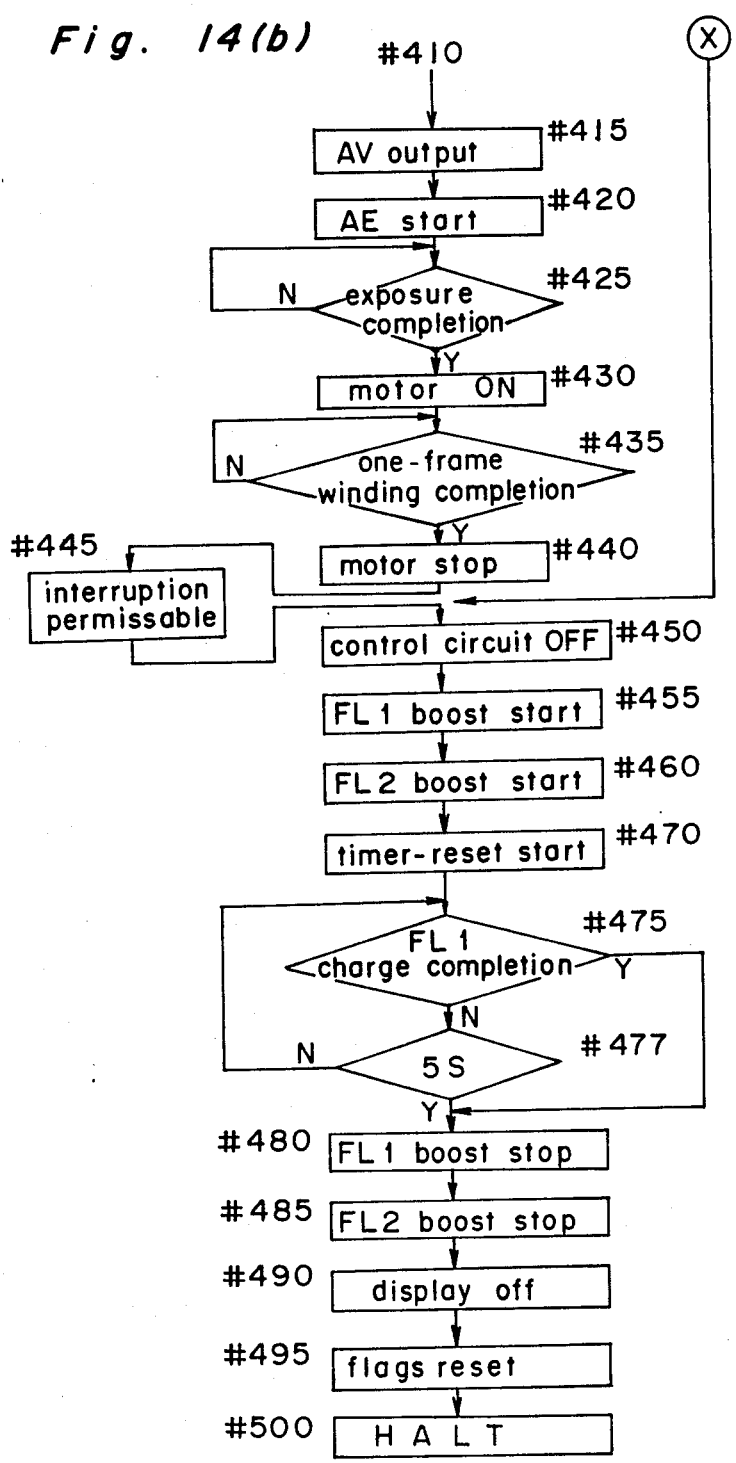

The subroutine is shown from the step #1070 of FIG. 12(b). In the step #1070, the decision is made as to whether or not the variable N1 is 1, i.e., the number of the light receiving regions in which the nearest distance region is detected is single. If it is single (N1=1), the program proceeds to the spot light measurement subroutine of the step #1075. When the number of the light receiving regions in which the nearest distance region is detected is plural, the program proceeds to the step #1080 to decide whether or not the light receiving region ① of the central portion is included in the plurality of regions in which the nearest distance region is detected. Even when it is included, the program proceeds to the step #1075. When the light receiving region of the central portion is not included at the step #1080, the average light measurement flag AVRE is set at the step #1085. The program proceeds to the average light measurement subroutine, and returns to the original flow with BV2 (average light measurement value) as the light measurement data BV.

The spot light measurement and average light measurement subroutine among the light measuring data subroutine will be described with reference to FIG. 13. First, in the spot light measurement subroutine shown in FIG. 13(b), the microcomputer MC outputs the variable N2, showing the number of the light receiving regions, to the decoder DE2 (#1160). The decoder DE2 decodes the inputted variable N2, and controls to turn on one of the analog switches ANSW in order to output the analog light measuring signal which corresponds to the brightness of the region related to the variable N2, to the A/D converting circuit A/D. The microcomputer MC outputs the A/D conversion start signal from the terminal OP6 to convert the light measuring signal of this analog form into the digital form at the step #1165, and decides with the signal of the terminal OP7 whether or not this A/D conversion has been completed at the step #1170. After the completion of the A/D conversion, the A/D completion signal is outputted from the terminal OP6 at the step #1175 and the digital-converter light measuring data are inputted to the microcomputer MC as the brightness value BV.

The average light measurement subroutine shown in FIG. 13(a) will be described hereinafter. The variables BV2 and I are set to 0 (#1105, 1110) and this variable I is outputted to the decoder DE2. As in the case of the above-described spot light measurement operation, the light measuring output of the analog form showing the brightness of the light receiving region corresponding to this variable I is converted in digital form by the A/D converter A/D to input the light measuring data as BV1 (#1120 through 1135). The data BV1 are added to the data BV2 at the step #1180 and 1 is added to the variable I at the step #1145. And it is decided whether or not the variable I has reached 9 (#1150). If it reaches 9, it is assumed that the light measuring data showing the brightness has been inputted from all the light-receiving regions ① through ⑨, and the program goes to the next step. If it is not 9, the program returns to the step #1115 to repeat this loop to perform the data inputting operation. After the inputting operation of all the data is over, the microcomputer MC divides the data BV2, i.e., the light measuring data of all of the respective light-receiving regions, by 9 to obtain the average brightness data at the step #1155. It may be modified to obtain the average brightness data by averaging all of the light measuring data, even if a plurality of light receiving regions detect the nearest distance region. The step #1080 should be omitted for this modification.

Returning to the flow of FIG. 11, the film-sensitivity data SV from the film sensitivity setting circuit IS are read in A.P.E.X. system at the step #175 to add the brightness data BV to this value SV to obtain the exposure value EV (#180). The limited exposure value (EV) for switching from the natural light photographing mode to the flash photographing mode will be explained. The limited exposure value (EV) is changed in accordance with the detected distance region. In the step #185, the decision is made as to whether or not the distance region is region 1. If it is 1, the program goes to the step #190 to decide whether or not the exposure value EV is 13.5 or more. If the exposure value EV is less than 13.5, the exposure value EV is fixed to 13.5 (#235) to go to the step #270. If the distance region is region 2, the exposure value is secured to 11.5 when the exposure value EV is less than 11.5 at the step #230. If the distance region is region 3, the exposure value EV is secured to 9.5 when the exposure value EV is less than 9.5 at the step #225. If the distance region is region 4 or 5, the exposure value EV is fixed to 8.5 when the exposure value EV is less than 8.5 at the step #230. The program moves to the step #270 respectively to enter into the flash photographing mode (#195 through 235).

If the exposure value EV is 13.5 or more when the distance region is region 1, if the exposure value is 11.5 or more when the distance region is region 2, if the exposure value EV is 9.5 or more when the distance region is region 3, and if the exposure value EV is 8.5 or more when the distance region is region 4 or 5, the program moves to the step #240 to decide whether or not the average light measurement flag AVRF is set. When this flag AVRF is not set, the program goes to the step #245 to execute the average light measurement subroutine to obtain the average brightness data BV2 for getting the difference between the obtained spot brightness data BV and it so as to decide whether or not the difference is 2EV or more at the step #255. If this difference is 2EV or more, the daylight synchronous flag FILF is set because a primary object is in backlight condition. The program moves to the step #270 to enter the flash photographing mode (#250 through 260).

When the average light measurement flag AVRF is set in the step #240, or when the difference between the average brightness data and the spot brightness data value is less than 2EV, the program moves to the step #265, and moves to the step #390 to be described later to calculate the aperture value AV to move to the flow of the shutter release operation.

The flash photography mode from the step #270 will be described hereinafter. The decision is made as to whether or not the charging operation of the main capacitor of the electronic flashing apparatus FL1 for photographing use has been completed at the step #270. If it has been completed, the program moves to the step #310 to display the completion of the photograph preparation. If the charging operation has not been completed, the decision is made as to whether or not the release button is depressed to the first stroke. When the release button is depressed to the first stroke, it is displayed that the charging operation of the electronic flashing apparatus FL1 is not completed. Then, the removal of the depression of the release button is waited for (#275, 280). After the depression of the release button is removed, the microcomputer MC turns off the transistor Tr1 to cut out the power supply to the control circuit to start the boosting operation of the electronic flashing apparatus FL1 for photographing use (#285, 290). And the timer for battery check use is reset and is started to decide whether or not the charging operation has been completed within ten seconds. When the charging operation has not been completed within ten seconds, the boosting operation is stopped at the step #320, the timer for warning display use is reset and is started at the step #325, the battery check warning is performed for five minutes at the steps #330 and 335. Then, all of the displays are turned off at the step #340, and the flags are reset at the step #345. Thereafter, the microcomputer MC becomes in halt condition at the step #350. If the charging operation is completed within ten seconds, the program moves to the step #310 to display the completion of the photographing preparation, and moves to the step #355.

In the step #355, the aperture value AV1 used in the flash photographing mode is calculated. The distance value DV in the step #355 is the value which becomes 5, 4, ... 1 in response to the distance regions 1, 2, ... 5. For example, supposing that the guide number of the electronic flashing apparatus FL1 is 10 with respect to the film sensitivity of ISO 100, and that the distance region detected is the region 2, the distance value DV is 4 and the film sensitivity SV is 5, respectively, if the amount of light emitted by the flashing apparatus FL1. In the case, the calculated aperture value AV1 is 6.5, that is, the F-number of F/9.3. Then, the decision is made as to whether or not this calculated aperture value AV1 is less than 3.5 at the step #357. When it is less than 3.5, it is secured to 3.5 at the step #360 and the program goes to step #362. And the decision is made as to whether or not the daylight synchronous flag FILF is set. When the flag FILF is not set, the aperture value for exposure use is calculated from the exposure value EV fixed by each region to output the data of the aperture value AV1 showing the light emitting timing of the flash photographing operation (#385). When the flag FILF is set, the aperture value AV2 based on the average brightness data BV2 is obtained at the step #370 to compare it with the aperture value AV1 of the flash photographing operation (#375). Here, the decision is made whether or not the exposure amount of the primary object becomes proper in the daylight synchronized flash mode.

Generally, the exposure amount of the primary object becomes proper by the flash light while the background thereof becomes in proper exposure by the natural light, in the daylight synchronized flash mode. In the case where the aperture value is determined for the natural light photographing condition, the aperture value AV1 for flash photographing should be compared with the aperture value AV for discriminating whether the primary object located at the detected distance region becomes in proper exposure by the flash light whose intensity is constant. Since the shutter serving also as an aperture diaphragm is gradually opening, the start of flash light emission can be performed at any timing during the opening. Therefore, if the aperture value AV1 is equal to or greater than the aperture value AV, proper exposure can be reproduced with respect to the primary object. Namely, when the aperture value AV1 for the flash photographing operation is equal to or greater than the aperture value AV for the natural-light photographing operation, the proper daylight synchronized flash photographing is performed. In the daylight synchronized flash mode, the microcomputer MC outputs the data of the aperture value AV1 as the light emitting timing data of the flash apparatus at the step #385 with the aperture value AV2 of the average light measurement as the control aperture value AV at the step #380. When the primary object is not exposed to the proper exposure by the flash photographing operation even in the backlight condition, the control aperture value AV is obtained in accordance with the brightness value in the spot light measurement to perform the natural-light photographing operation only (#390).

At this time, the microcomputer MC decides whether or not the release operation, i.e., the depression of the release button as far as the second stroke is effected at the step #392. When the release operation is not effected, the program moves to the step #395 to decide whether or not the release button is depressed as far as the first stroke. When the release button is in its depressed position, it returns to the step #390 to wait for the release operation. When the release button is not depressed as far as the first stroke, the program moves to the step #450 to be described later.

When the computer decides, at the step #392, that the release operation is affected, the program enters the release control operation to, first, prohibit the interruption to this flow at the step #397, and the microcomputer MC outputs the distance region data to the AF control circuit AFC at the step #400. Then, the microcomputer MC outputs the start signal to start the driving operation of the objective lens. When the objective lens is driven to the given position in accordance with the data, the switch (S5) showing the AF control completion is turned on, so that the microcomputer MC detects the AF control completion (#410). Then, the date of the control aperture value AV is outputted to the AE control circuit AE, and the AE control start signal is outputted (#415, #420) to the AE control circuit AE. When the light emitting timing data of the flash during the flash photographing operation is sent from the microcomputer MC in the AE control circuit AE, a flash signal is outputted to the electronic flashing apparatus FL1 for photographing use at the given timing in accordance with the data.

When the exposure control is performed in the AE control circuit and the switch S3 showing the exposure completion is turned on, the motor is driven to wind up one frame of the film. When the film is wound up by one frame, the motor is stopped (#425 through 440). The microcomputer MC permits the interruption to this flow at the step #445, and turns off the control circuit at the step #450. Then, the microcomputer MC starts the boosting operation of the electronic flashing apparatuses FL1, FL2 in preparation for the next photographing operation, and the timer for the boosting control use is reset and started at the step #470. The respective boosting operations are stopped when the charging operation is completed in five seconds or five seconds pass, and the display is turned off thereafter. Then, all the flags are reset and the microcomputer MC is in halt condition.

Though the first embodiment of the present invention is described hereinabove in such a manner that, the nearest distance region among the plurality of detected distance regions is provided as the distance region for the focusing operation, in the second embodiment described hereinafter, each light-receiving region is weighted when the distance region is obtained, and the weighted value is added for each distance region to detect which distance region is the most frequent. And the interval between the most frequent distance region and the nearest distance region, for example, in the case of the distance region 1 and the distance region 3 the intermediate distance region, that is, the distance region 2 in the above-described example, is applied as the distance for focusing operation. In the intervals except for it, the nearest distance is provided as the distance for the focusing operation. The brightness detection and the backlight detection are performed as in the first embodiment.

Figure 15:
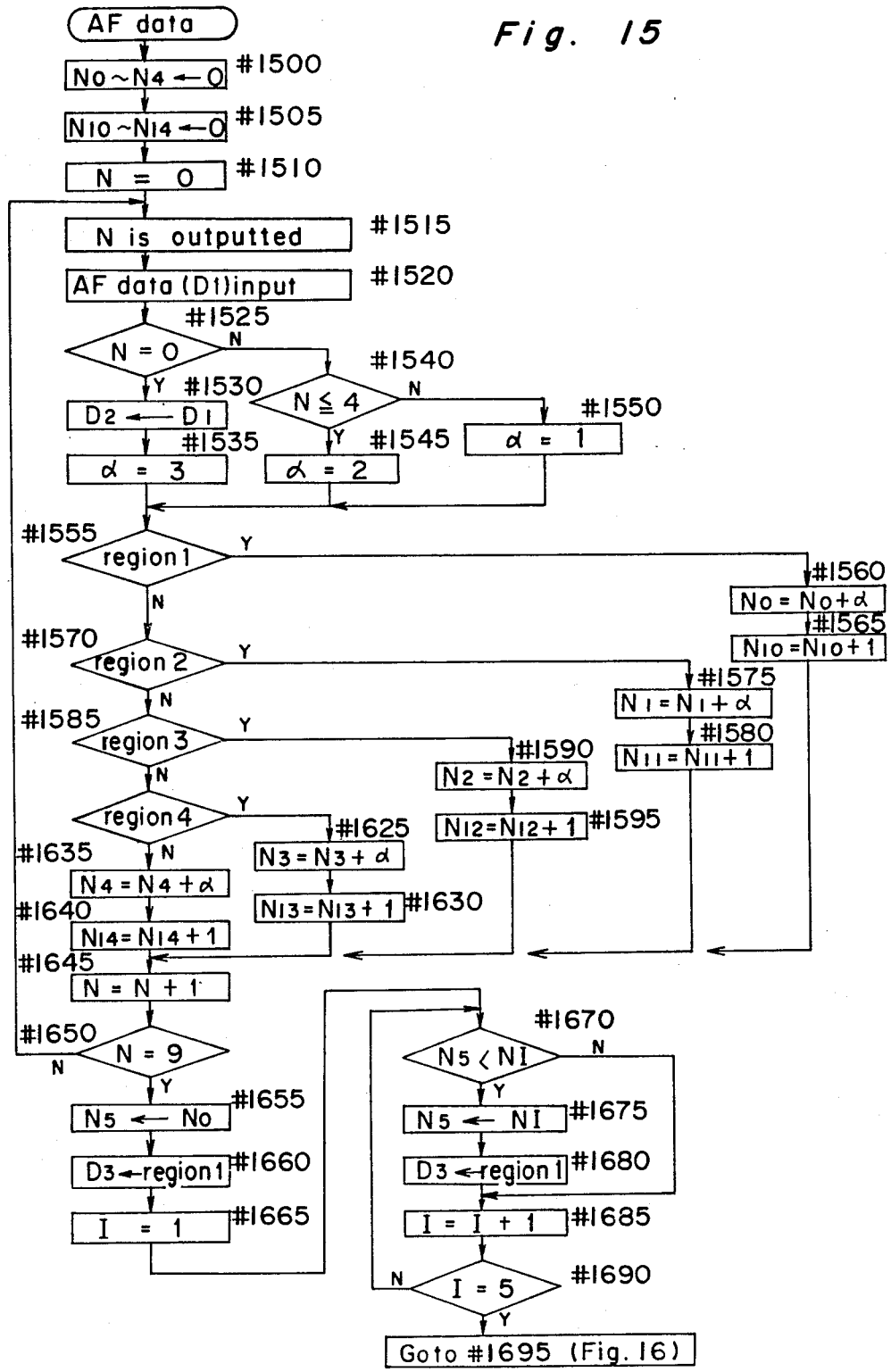

The flow chart for the operation of the microcomputer MC which executes the second embodiment is shown in FIG. 15, FIG. 16. This flow chart shows the modified example of the AF data subroutine shown in FIG. 12(a), and the light measurement data subroutine shown in FIG. 12(b) with the entire flow being completely the same as FIG. 11, FIG. 13 and FIG. 14.

The flow chart will be described hereinafter. First, the microcomputer MC sets variables N0 through N4, N10 through N14, and N to 0 at all (#1500 through 1510). The variable N is outputted to the decoder DE2, and the data D1 of the distance region coming from the given light receiving region is inputted (#1515, 1520). Then, the microcomputer MC operates the weighting operation of 3, 2, 1 respectively to the light receiving regions 1, 2 through 5, 6 through 9 with respect to each light-receiving region. When the light-receiving region is 1 (N=0), the α as the weighting data is assumed as 3 (#1535) with this input data D1 being as the data D2 (#1530). If the light-receiving region is 2 through 5 likewise, the α is set to 2. If the light-receiving region is 6 through 9, the α is set to 1 (#1540 through 1550).

Then, the microcomputer MC adds the sum of the number of light receiving regions belonging to each distance region and the weighting data. When the distance region of the light receiving region is 1, 2, . . . 5, the weighting data are added respectively to N0, N1, . . . N4, and the number of the light-receiving regions are added to N10, N11 . . . N14 (#1555 through 1640). The decision is made as to whether or not N has become 9 through addition of 1 to the N. If the N has not become 9, the program returns to the step #1515 to repeat this loop until the N becomes 9. If the N is 9, the program moves to the step #1655 (#1645, #1650), considering that all the distance data have been inputted, and the microcomputer MC obtains the distance region including the light receiving region of the most frequent. In the step #1655, the value of the N0 showing the addition value of the weighted data of the distance region 1 is shifted to the N5, then the data showing that the distance region is 1 is inputted into the variable D3 and the variable I is set to 1 (#1660, 1665). Then, the weighted data N5 established is compared with the NI (I is the established value), for example, the addition value of the weighted value corresponding to the distance region 2 if I=1. If the NI is larger, the value of the N5 is changed to the value NI and the distance region at this time is inputted into D3 (#1670 through 1680).

Even when the NI is equal to or less than N5, the program goes to the next step #1685 to add 1 to the I. And the decision is made whether or not the I has become 5. If the I has not become 5, the program returns to the step #1670. If the I becomes 5, the microcomputer MC obtains the nearest distance region and the distance between this region and the distance region of the most frequent value to obtain the distance region for the focusing operation. The microcomputer MC obtains the distance region where the value of the weighted data is not 0 in order from the distance region 1 to the distance region 4. The data showing this distance region at a time when the value of the weighted data not been 0 is inputted into D0 to input the number of the light receiving regions in that region into N7 (#1695 through 1760).

When the nearest distance region is one of the regions 1 through 3, the decision is made whether or not the distance between the nearest distance region and the distance region of the most frequent value is only one region. When the distance is one region, the data in the middle region is inputted into the D0 (#1765, #1770), and the program proceeds to the step #1775 of the light measurement data subroutine. When the nearest distance region is the region 4 or 5, the distance between the nearest distance region and the distance region of the the most frequent value does not become 1, the program moves to the step #1775 as soon as the inputting operation to D0, N7 is completed. In the light measurement data subroutine as compared with FIG. 12, the processed content of the microcomputer MC is completely the same except for the N1 being changed into N7.

The present invention is not restricted to this embodiment described hereinabove. The following modified embodiments may be applied.

(1) In the first and second embodiments, the brightness data obtained by the average light measurement of all regions are used for controlling the exposure amount, when the number of light receiving regions in which the nearest distance region is detected or when the central region is not included for detecting the distance region for the focusing operation. However, the exposure amount may be controlled in accordance with the average of the brightness data in all the light receiving regions showing the nearest distance region may be used. Thus, the number of the light receiving region in which the nearest distance region is detected is required to be memorized. The brightness data of the light receiving region are required to be inputted in accordance with this number to provided this average. Also, when the number of the light receiving regions in which the nearest distance region is detected are plural, the average light measurement value of all the regions may be used.

(2) Though the electronic flashing apparatus which is disposed separately from the electronic flashing apparatus for the photographing use is provided as the light emitting means for the distance detection means of the present embodiment, this may use the electronic flashing apparatus for photographing use in common. In the case of the distance detection, the infrared transmission filter of the particular wavelength is required to be provided on the entire face of the light emitting portion. In the case of the photographing operation, such mechanical construction as to remove this filter is required to be provided. Also, the light emitting means may be such a plurality of LEDs as shown in Japanese Patent Application Laid-open Publication Tokkaisho No. 59-146032. Also, one LED may be required with being sequentially scanned.

(3) If the primary object does not become proper with the flashing photographing operation only in the embodiment when the backlight light condition is detected, the photographing operation is switched from the flash photographing mode to the natural-light photographing mode. In addition, in the natural-light photographing operation, the light measuring operation is switched from the average light measurement to the spot one. However, since the film has a latitude, there is no necessity to provide the most proper exposure amount of the primary object. Concretely, if the exposure amount of the primary object is low by 1.5 steps than the most proper exposure amount, the image of the primary object can be reproduced sufficiently by the latitude of the film. Thus, it may be permitted that the exposure amount of the primary object by the flash light is lower by 1.5 steps than the calculated proper exposure amount in daylight synchronized flash photographing.

(4) In addition, the (1) through (3) of the above-described examples may be properly combined with the first, and second embodiments.

(5) Though the distance from the camera to the object is detected with a plurality of regions in the object area to be photographed in the embodiments, the defocus amount of the objective lens may be detected with the plurality of regions.

(6) Since the distance detection and the brightness detection use the common light measuring circuits LM1 through LM9 in the embodiments, the distance detection regions are completely similar to the brightness detection regions, respectively. However, both of the regions may be deviated from each other, or the size of both regions may be different from each other.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be constructed as included therein.

What is claimed is:

1. Control device for use in a camera having an objective lens, comprising:
    means for producing a plurality of distance signals on a plurality of first regions of an object area to be photographed;
    means for determining a distance on the basis of the plurality of distance signals to produce a determined distance signal for focusing the objective lens;
    means for driving the objective lens in accordance with the determined distance signal;
    means for measuring a plurality of brightnesses of second regions of the object area to produce a plurality of brightness signals each corresponding to the measured brightness respectively, each of the second regions being substantially similar to each of the first regions, respectively;
    means for counting the number of the distance signals representing an identical distance to a distance represented by the determined distance signal;
    means for discriminating whether the number counted by the counting means is single or plural;
    means for determining a light measuring value on the basis of a brightness signal of a single second region corresponding to a single first region whose corresponding distance signal represents an identical distance to a distance represented by the determined distance signal when the discriminated number is single, while determining a light measuring value which corresponds to a brightness of almost the entire object area when the discriminated number is plural; and,
    means for calculating exposure value of the camera in accordance with the light measuring value.

2. Control device as claimed in claim 1, wherein the light measuring value determining means includes means for averging the plurality of brightness signals to determine a light measuring value, when the discriminated number is plural.

3. Control device as claimed in claim 1, wherein the distance signals producing means includes a plurality of light receiving elements each corresponding to each of first regions, and the brightnesses measuring means includes means for measuring a plurality of brighnesses on the basis of output signals of the light receiving elements.

4. Control device for use in a camera having an objective lens, comprising:
    means for producing a plurality of distance signals on a plurality of first regions of an object area to be photographed;
    means for determining a distance on the basis of the plurality of distance signals to produce a determined distance signal for focusing the objective lens;
    means for driving the objective lens in accordance with the determined distance signal;
    means for measuring a plurality of brightnesses of second regions of the object area to produce a plurality of brightness signals each corresponding to the measured brightnesses respectively, each of the second regions being substantially similar to each of the first regions, respectively;
    means for counting the number of the distance signals representing an identical distance to a distance represented by the determined distance signal;
    means for discriminating whether the number counted by the counting means is single or plural;
    means for determining a light measuring value on the basis of a single brightness signal of a single second region corresponding to a single first region whose corresponding distance signal represents an identical distance to a distance represented by the determined distance signal when the discriminated number is single, while determining the light measuring value on the basis of a plurality of brightness signals of at least a plurality of second regions corresponding to a plurality of first regions whose corresponding distance signals represent an identical distance to a distance represented by the determined distance signal when the discriminated number is plural; and,
    means for calculating exposure value of a camera in accordance with the light measuring value.

5. Control device as claimed in claim 4, wherein the light measuring value determining means includes means for determining a light measuring value which corresponds to a brightness of almost the entire object area, when the discriminated number is plural.

6. Control device as claimed in claim 5, wherein the light measuring value determining means includes means for averaging the plurality of brightness signals to determine a light measuring value, when the discriminated number is plural.

7. Control device as claimed in claim 4, wherein the distance signals producing means includes a plurality of light receiving elements each corresponding to each of first regions, and the brightnesses measuring means includes means for measuring a plurality of brightnesses on the basis of output signals of the light receiving elements.

8. Control device for use in a camera having an objective lens, comprising:
    means for producing a plurality of distance signals on a plurality of first regions of an object area to be photographed, the plurality of first regions including a central region of the object area and the plurality of distance signals corresponding to respective ones of the first regions;
    means for determining a distance on the basis of a selected group of the plurality of distance signals to produce a determined distance signal for focusing the objective lens;

means for driving the objective lens in accordance with the predetermined distance signal;

means for measuring a plurality of brightnesses of second regions of the object area to produce a plurality of brightness signals each corresponding to the measured brightnesses respectively, each of the second regions being substantially similar to each of the first regions, respectively;

means for discriminating whether the selected group includes the distance signal corresponding to the central region;

means for determining a light measuring value by a first calculation when the distance signal corresponding to the central region is discriminated to be included in the selected group, while determining the light measuring value by a second calculation different from the first calculation when the distance signal corresponding to the central region is discriminated not to be included in the selected group; and means for calculating exposure value of the camera in accordance with the light measuring value.

9. Control device as claimed in claim 8, wherein the light measuring value determining means includes means for averaging the brightness signals of the second regions corresponding to the first regions whose corresponding distance signals are included in the selected group used for producing the determined distance signal when the distance signal corresponding to the central region is discriminated not to be included in the selected group.

10. Control device as claimed in claim 8, wherein the light measuring value determining means includes means for determining the light measuring value on the basis of all of the plurality of brightness signals when the distance signal corresponding to the central region is discriminated not to be included in the selected group.

11. Control device as claimed in claim 10, wherein the light measuring value determining means includes means for averaging the plurality of brightness signals to determine a light measuring value.

12. Control device as claimed in claim 8, wherein the distance signals producing means includes a plurality of light receiving elements each corresponding to each of first regions, and the brightnesses measuring means includes means for measuring a plurality of brightnesses on the basis of output signals of the light receiving elements.

13. Control device for use in a camera having an objective lens, comprising:

means for producing a plurality of distance signals necessary for focusing the objective lens on a plurality of first regions of an object area to be photographed;

means for determining a distance on the basis of the plurality of distance signals to produce a determined distance signal for focusing the objective lens;

means for driving the objective lens in accordance with the determined distance signal;

means for measuring a plurality of brightnesses of second regions of the object area to produce a plurality of brightness signals each corresponding to the measured brightnesses respectively, each of the second regions being substantially similar to each of the first regions, respectively;

means for counting the number of the distance signals representing an identical distance to a distance represented by the determined distance signal;

means for discriminating whether the number counted by the counting means is single or not;

means for determining a first light measuring value on the basis of the brightness signals of the second regions corresponding to the first regions whose corresponding distance signals represent an identical distance to a distance represented by the determined distance signal;

means for determining a second light measuring value corresponding to a brightness of almost the entire object area;

means for detecting whether a primary object is in backlight condition or not in accordance with the first and second light measuring signals; and means for controlling exposure of the camera in accordance with the result of the detecting means when the discriminated number is single, while controlling the exposure independently of the result of the detecting means when the discriminated number is plural.

14. Control device as claimed in claim 13, wherein the second light measuring value determining means includes means for determining the second light measuring value on the basis of the brightness signals of at least the second regions corresponding to the first regions whose corresponding distance signals do not represent an identical distance to a distance represented by the determined distance signal.

15. Control device as claimed in claim 13, wherein the second light measuring value determining means includes means for determining the second light measuring value on the basis of all of the brightness signals of the second regions.

16. Control device as claimed in claim 13, further comprising means for interruping operation of the detecting means when the discriminating number is plural.

17. Control device as claimed in claim 13, further comprising means for illuminating the object area for photographing, and wherein the exposure controlling means includes means for controlling the illuminating means to energize the illuminating means for flash photography when the discriminated number is single, while de-energizing the illuminating means when the discriminated number is plural.

18. Control device as claimed in claim 13, wherein the distance signals producing means includes a plurality of light receiving elements each corresponding to each of first regions, and the brightnesses measuring means includes means for measuring a plurality of brightnesses on the basis of output signals of the light receiving elements.

19. Control device for use in a camera having an objective lens, comprising:

means for producing a plurality of distance signals on a plurality of first regions of an object area to be photographed, the plurality of first regions including a central region of the object area and the plurality of distance signals corresponding to respective ones of the first regions;

means for determining a distance on the basis of a selected group of the plurality of distance signals to produce a determined distance signal for focusing the objective lens;

means for driving the objective lens in accordance with the determined distance signal;

means for measuring a plurality of brightnesses of second regions of the object area to produce a plurality of brightness signals each corresponding to the measured brightnesses respectively, each of the second regions being substantially similar to each of the first regions, respectively;

means for discriminating whether the selected group includes the distance signal corresponding to the central region;

means for determining a first light measuring value on the basis of the brightness signals of the second regions corresponding to the first regions whose corresponding distance signals are included in the selected group used for producing the determined distance signal;

means for determining a second light measuring value corresponding to a brightness of substantially the entire object area;

means for detecting whether a primary object to be photographed is in backlight condition or not in accordance with the first and second light measuring signals; and means for controlling exposure of the camera in accordance with a result of the detecting means when the distance signal corresponding to the central region is discriminated to be included in the selected group, while controlling the exposure independently of the result of the detecting means when the distance signal corresponding to the central region is discriminated not to be included in the selected group.

20. Control device as claimed in claim 19, wherein the second light measuring value determining means determines the second light measuring value on the basis of the brightness signals of at least the second regions corresponding to the first regions whose corresponding distance signals are not used to produce the determined distance signal.

21. Control as claimed in claim 20, wherein the second light measuring value determining means determines the second light measuring value on the basis of all of the brightness signals of the second regions.

22. Control device as claimed in claim 20, further comprising means for counting a number of the distance signals in the selected group, means for discriminating whether the number counted by the counting means is single or plural; and means for interrupting operation of the detecting means when the discriminated number is plural.

23. Control device as claimed in claim 20, wherein the exposure controlling means includes:

means for calculating a first aperture value for a normal photographing on the basis of the second light measuring value, means for calculating a second aperture value for a flash photographing on the basis of the determined distance signal, means for comparing the first aperture value with the second aperture value, means for controlling exposure operation of the camera on the basis of the first light measuring value when the second aperture value is less than the first aperture value, while controlling the exposure operation on the basis of the second light measuring value when the first aperture value is less than the second aperture value, means for illuminating the object area in flash photographing, and means for energizing the illuminating means when the first aperture value is less than the second aperture value.

24. Control device as claimed in claim 20, wherein the distance signals producing means includes a plurality of light receiving elements each corresponding to each of first regions, and the brightnesses measuring means includes means for measuring a plurality of brightnesses on the basis of output signals of the light receiving elements.

* * * * *